United States Patent Office 3,516,653
Patented June 23, 1970

3,516,653
METHOD OF AND APPARATUS FOR ASSEMBLING STACKS OF FLEXIBLE SHEETS IN A PREDETERMINED ORDER
Geoffrey Bland, Newcastle, England, assignor to Formica International Limited, London, England, a British company
Filed Apr. 18, 1967, Ser. No. 631,753
Claims priority, application Great Britain, Apr. 26, 1966, 18,214/66
Int. Cl. B32b 31/00; B65h 39/02
U.S. Cl. 270—58        2 Claims

ABSTRACT OF THE DISCLOSURE

A method and apparatus for facilitating the assembly of a stack of flexible sheets on a horizontal support surface in which sheets are removed in order from a plurality of stacks onto a sheet support member which carries the sheets to a position above a receiving support station for the final stack. The invention is particularly concerned with the manufacture of laminates of resin impregnated sheets of paper or the like.

---

This invention relates to a method of and apparatus for facilitating the manual assembly of sheets of material upon a horizontally disposed support surface. The invention is especially applicable to the laminating industry in which it is necessary to build up multilayer stacks of resin impregnated sheets of fibrous material such as paper before consolidating them under the action of heat and pressure to form the finished laminates.

In practice, each finished laminated board is made up of an assembly of sheets comprising a set of core sheets, a decorative print sheet and a melamine impregnated surface sheet and, for economic reasons, a large number of such boards are produced simultaneously between the platens of a multidaylight press. Furthermore, in order to ensure that the maximum possible use is made of the press it is desirable that the time taken to preassemble a press load be less than the pressing time for the consolidating operation. For example, if the daylight openings of a particular press are capable of accommodating a total of 240 boards and the pressing time is 80 minutes it follows that the average time to build up the multiple layers of paper, as referred to above, should not exceed 20 seconds for each board. It is customary to provide in each multilayer stack, between adjacent pairs of individual board assemblies, a press plate which serves to separate adjacent decorative surfaces and to impart a desired finish thereto; for example the press plate may be highly polished on both sides and in such cases the paper assemblies must be alternatively arranged so that the melamine impregnated surface sheets are always disposed towards a polished surface.

To avoid damage to the finished boards or polished press plates it is essential to prevent ingress of dust particles, etc., into the stack, therefore it is preferable to carry out the building up process under dust free conditions within a sealed room. Heretofore the operation has involved laying stacks of the various sheets upon racks and manually withdrawing sheets of the correct quantity and type and depositing them upon a laying-up table and interposing them with polished plates in the order referred to above.

It is the object of the invention to facilitate the handling of the paper sheets by reducing the number of manipulation sequences despite the considerable difficulty that is normally experienced in rapidly transposing large sheets of paper (which may be in the order of 60 square feet) without causing accidental damage, especially as some of the sheets are inherently brittle.

According to the invention there is provided a method of assembling a stack of thin flexible large-sized sheets comprising establishing a plurality of bulk storage stacks each comprising either a different type of sheet from that of the other storage stack or stacks or different type sheets in a prearranged order, manually transporting one or more sheets from each storage stack to a movable sheet support member in desired sequence, moving the sheet support member towards a sheet receiving station so that the sheets are positioned above the sheet receiving station, and holding the leading edges of all the sheets on the sheet support member while withdrawing the sheet support member so that the sheets are deposited from the sheet support member onto the sheet receiving station.

In a preferred arrangement the sheet materials are resin-impregnated paper and, for example, there are two bulk storage stacks one including alternating pairs of laminate print sheets and laminate overlay sheets and the other laminate core sheets. It is preferred that two pairs of laminate print sheets and laminate overlay sheets are passed from said other stack to the sheet support member, a group of core sheets passed from the one stack onto the sheets already supported by the sheet support member, half this group of core sheets is passed from the sheet support member to the sheet receiving station, and then the sheet support member is moved to a position above the sheet receiving station and the sheets supported thereon deposited upon the core sheets already positioned at the sheet receiving station.

According to a further aspect of the invention there is provided apparatus for stacking relatively large flexible sheets, comprising a plurality of horizontally disposed supports for receiving storage stacks of sheets, a horizontally disposed sheet receiving station support, and a sheet support member movable between the stacks and a position over the sheet receiving station for temporarily supporting sheets moved from the storage stacks and conveying them to the receiving station.

Preferably, the intermediary sheet support member is cantilevered from a slidable mounting bracket in such a manner that its supporting surface is capable of passing above the delivery stage. The mounting bracket may conveniently be carried on parallel horizontal guide rails situated below the level of the delivery stage, and is power actuated by means of a chain and geared electric motor.

Preferably, elevating means are provided for one of the said storage stacks so that the topmost sheet of the stack can be maintained at substantially the same height as the surface of the intermediary sheet support member.

Preferably, the surface of the intermediary support member is telescopically adjustable in a direction at right-angles to the said guide rails to accommodate paper sheets of different lengths.

The invention will now be described, merely by way of example, with reference to the accompanying drawings, in which:

FIG. 1 is a diagrammatic end view of apparatus embodying the invention illustrating one position in the operating sequence thereof;

FIGS. 2, 3 and 4 are views similar to FIG. 1, but showing further positions in the operating sequence of the apparatus; and FIGS. 5 and 6 show, to a larger scale, end and fragmental plan views of the movable support member comprising part of the apparatus of FIG. 1.

Figures 9, 10:
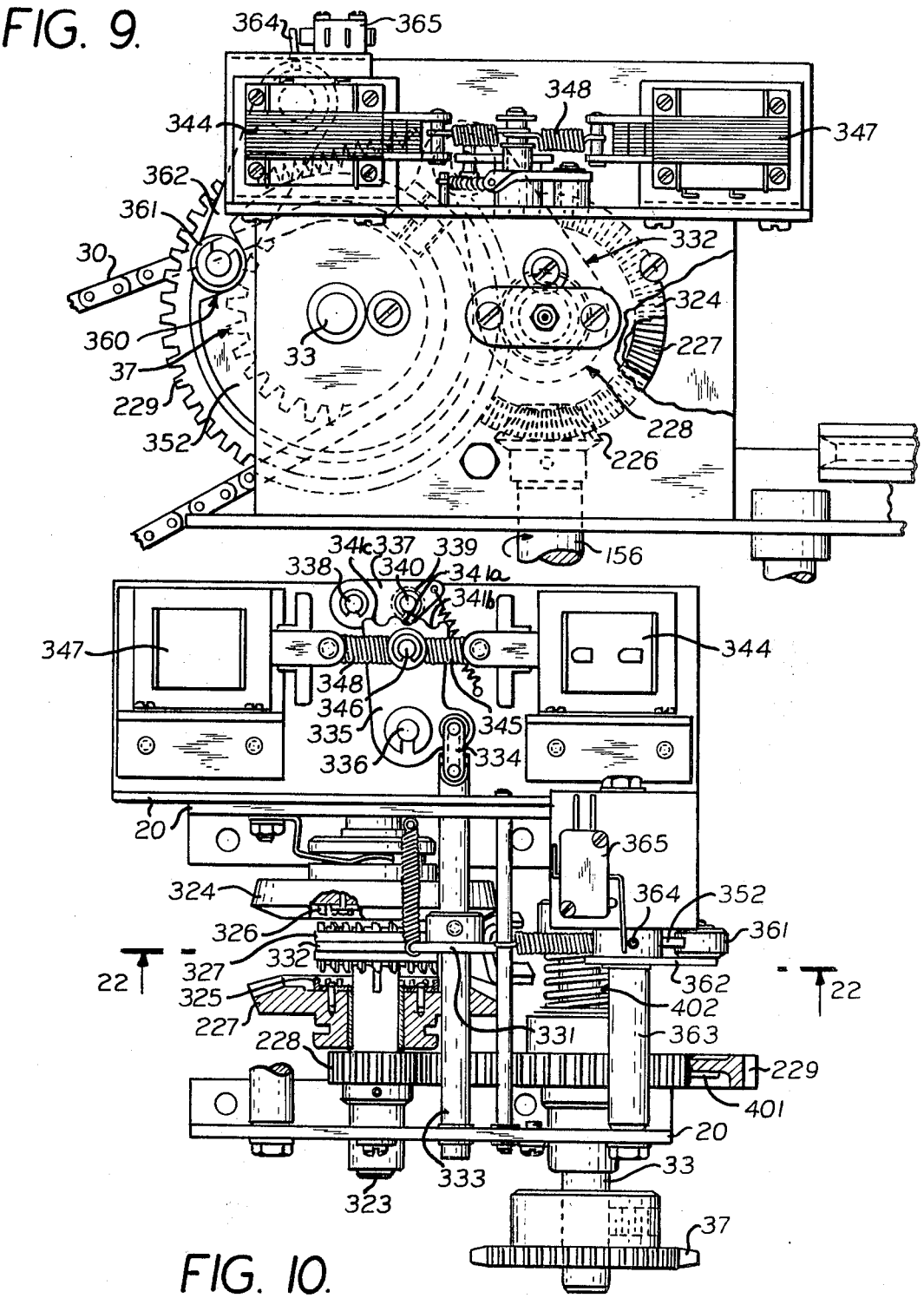

For the purpose of example the invention will be described in relation to the manufacture of laminated boards which each comprise the following components:

June 23, 1970     L. MESTRE     3,516,654
SHEET SORTER HAVING AUTOMATIC SHEET FEED CONTROL AND RESTART
Filed April 18, 1968     13 Sheets-Sheet 2
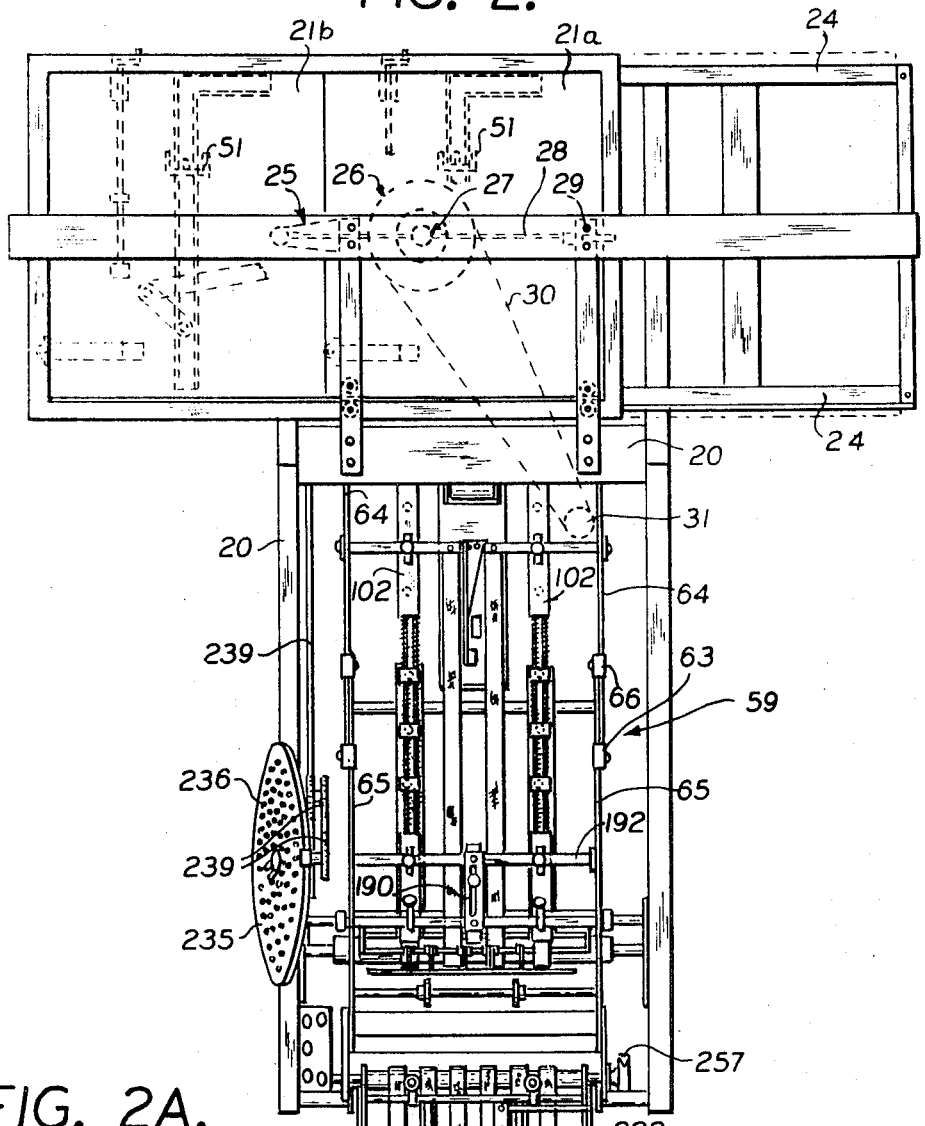
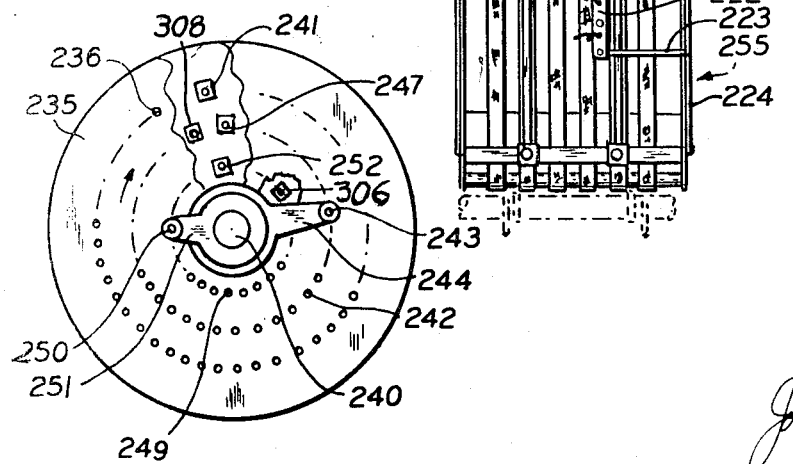
INVENTOR
LUIS MESTRE
BY
John M. Montstream
ATTORNEY.

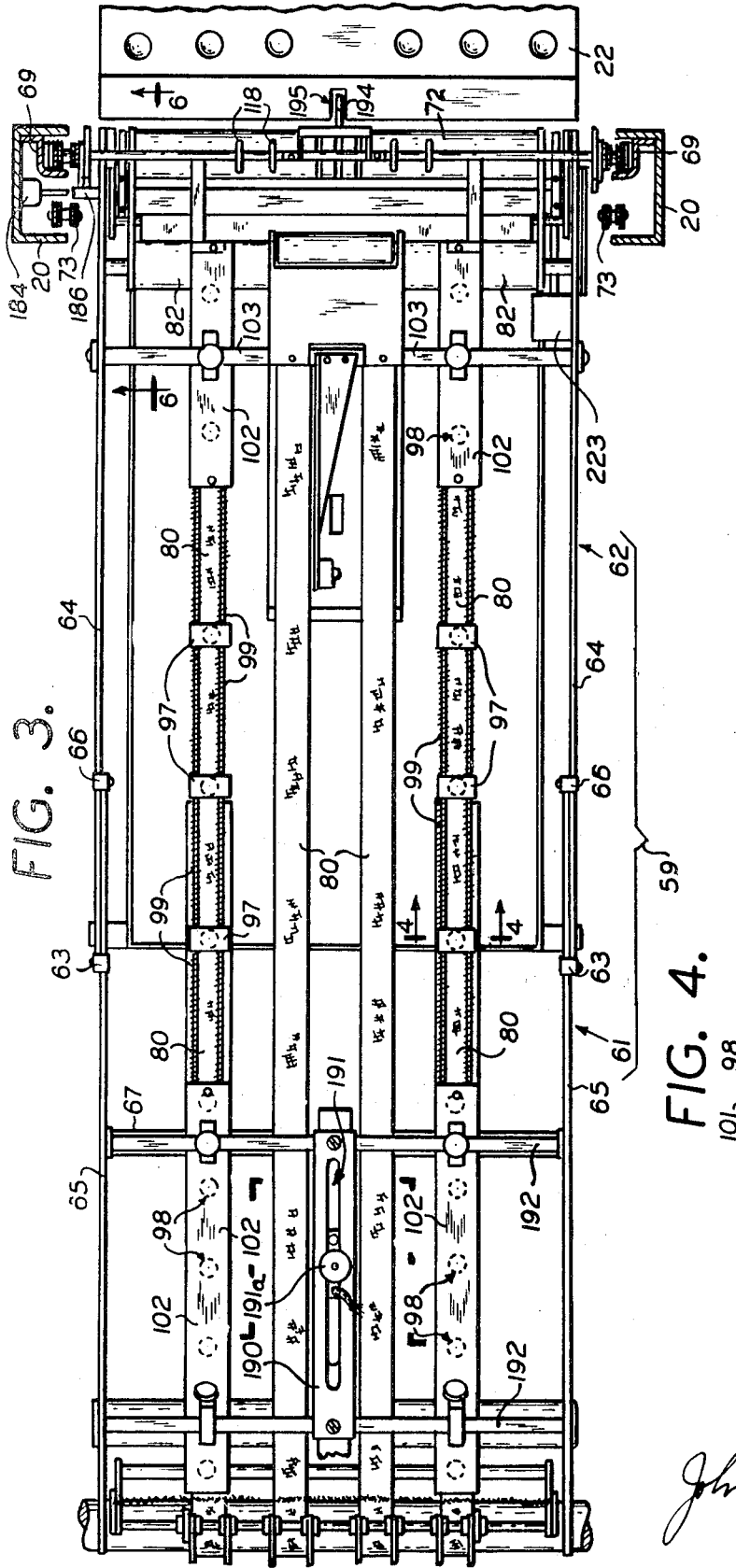

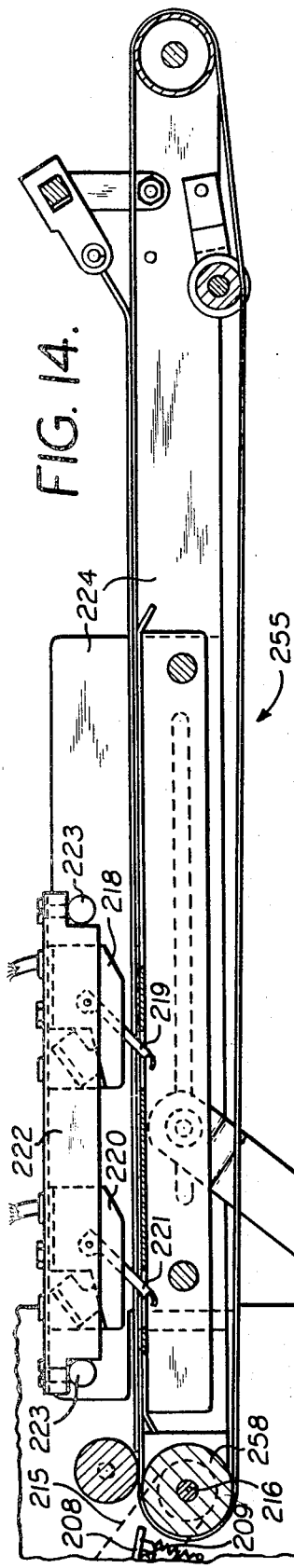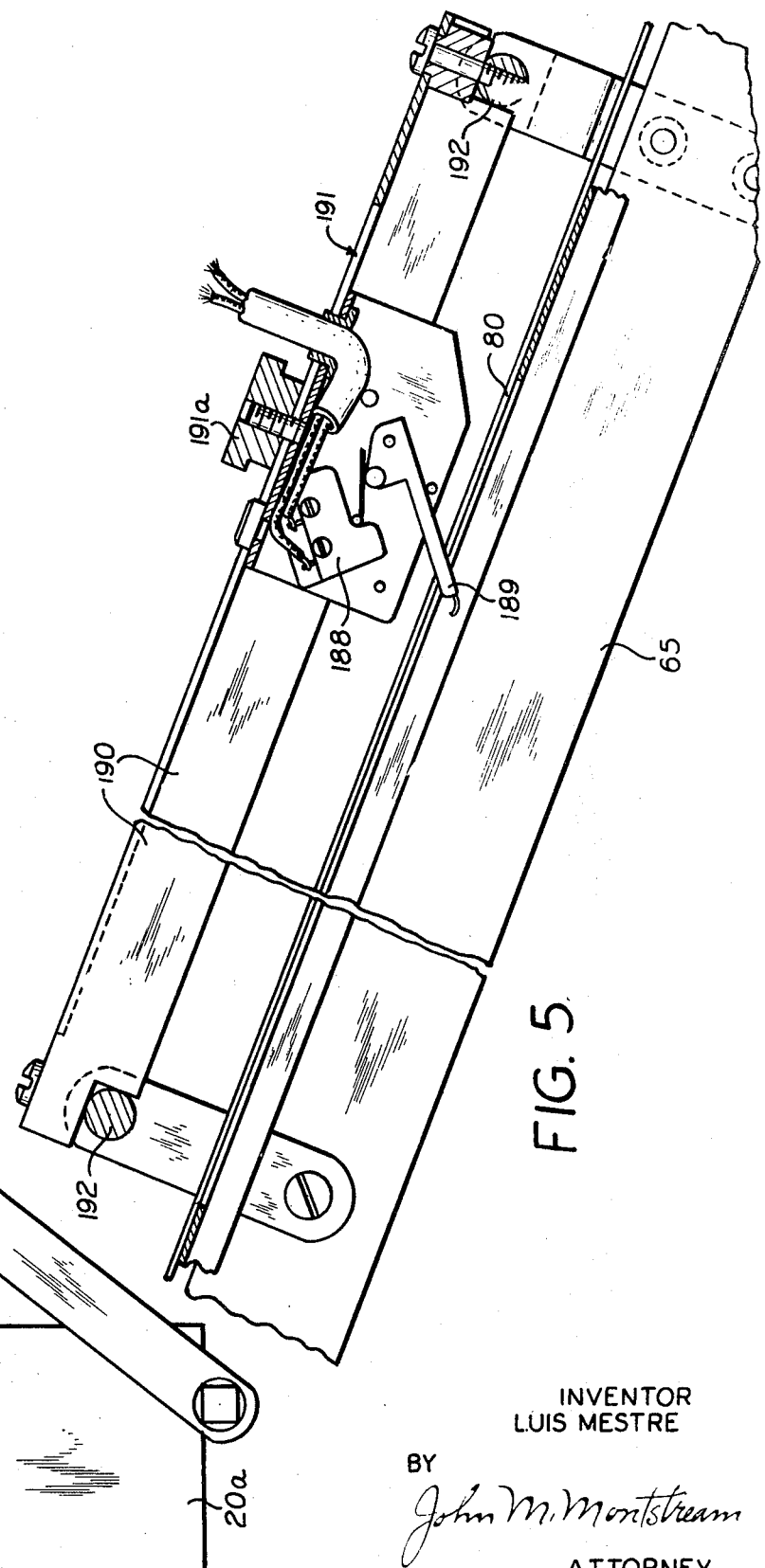

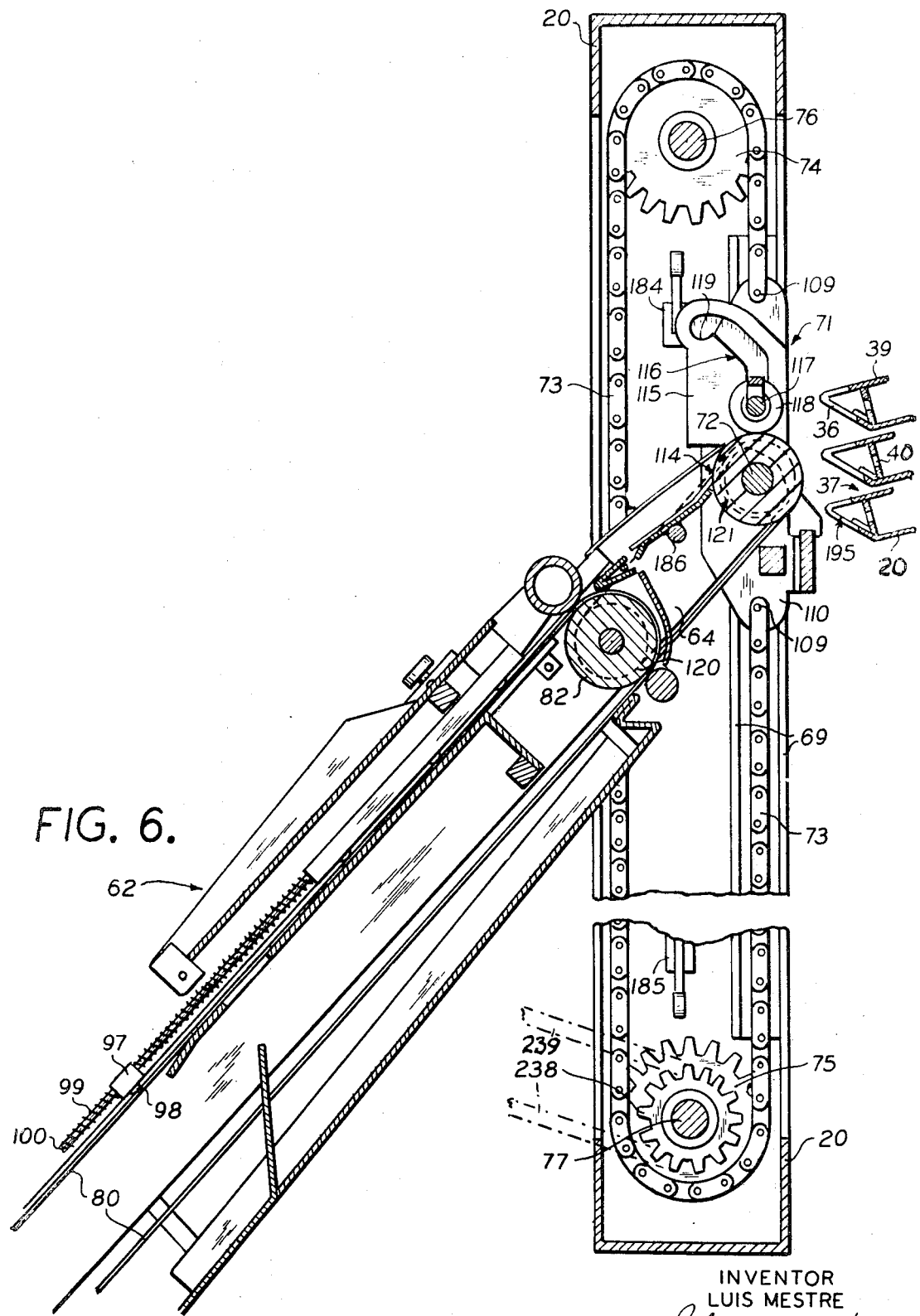

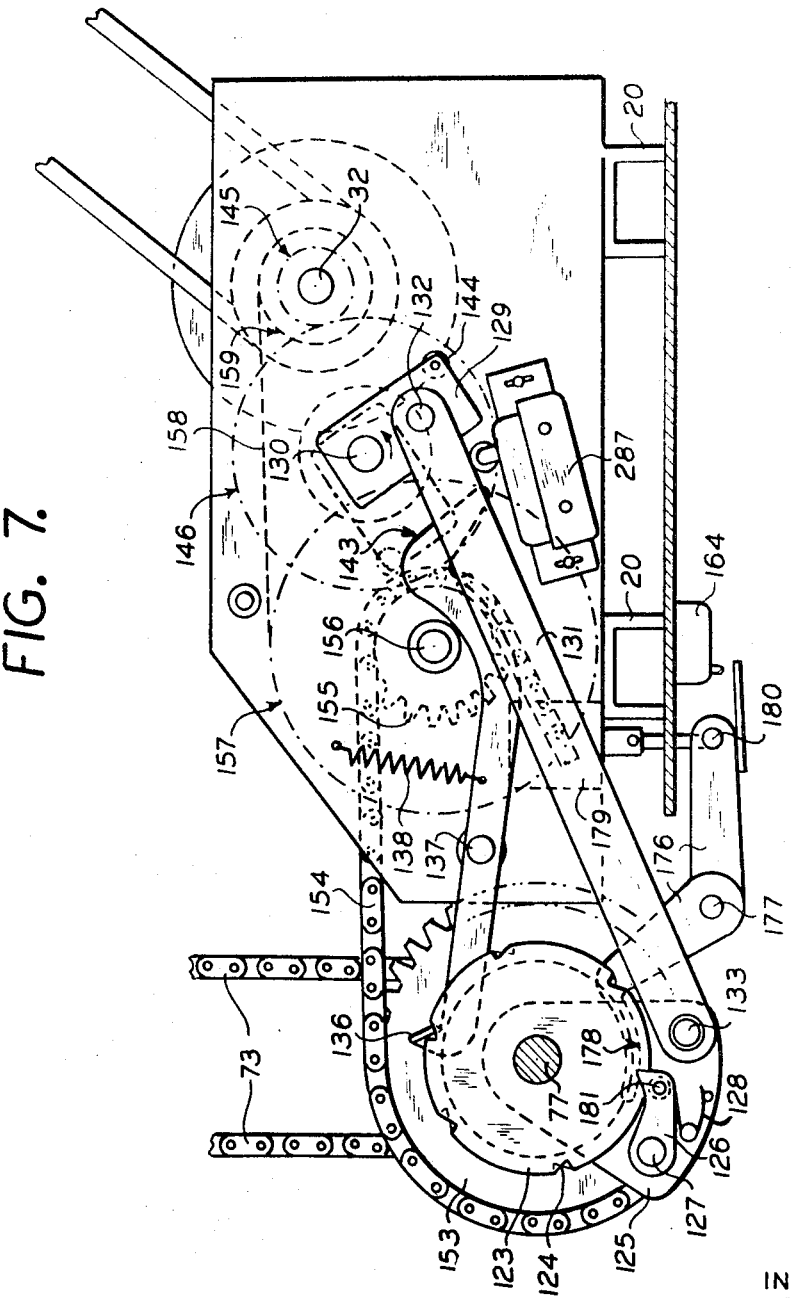

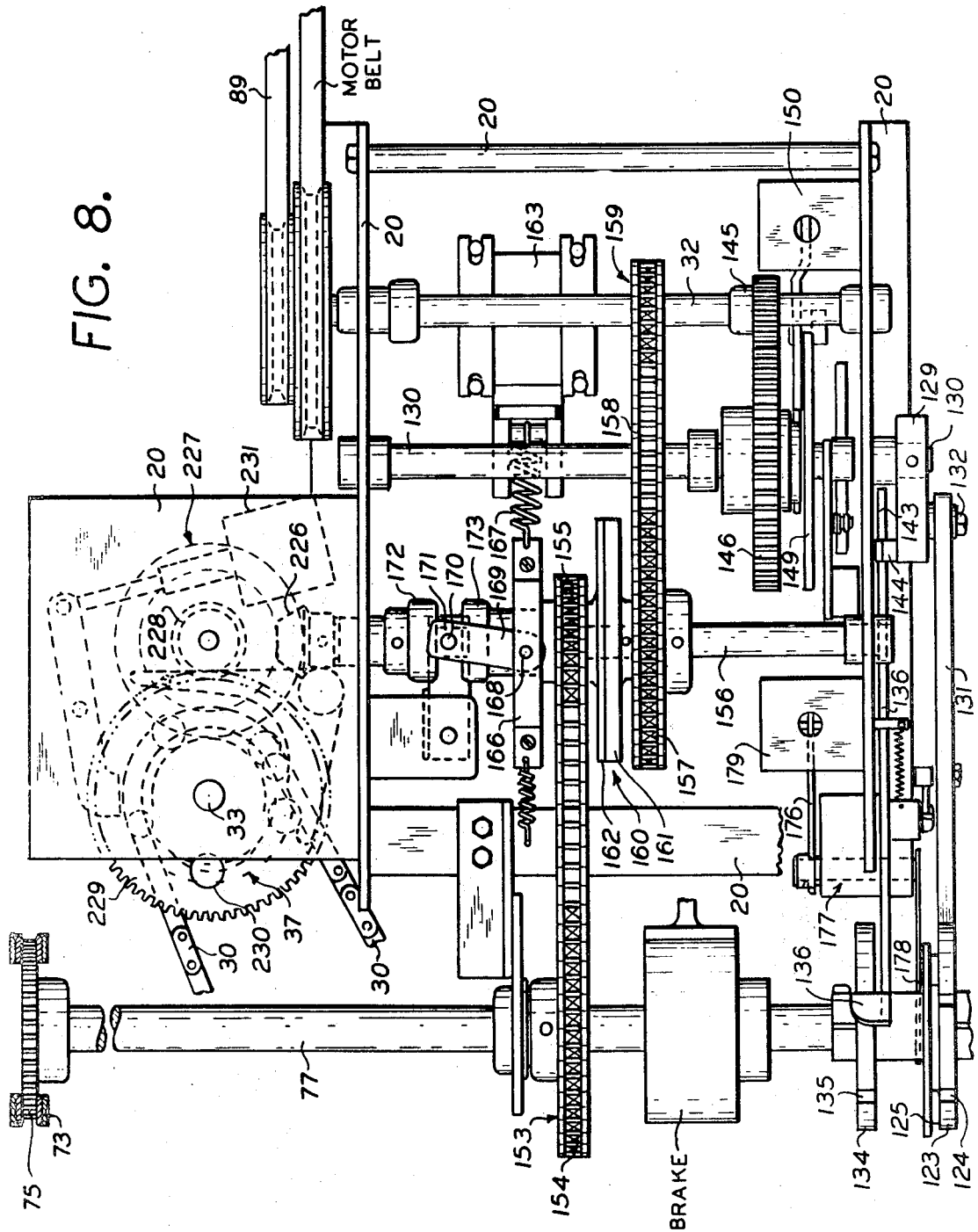

June 23, 1970  L. MESTRE  3,516,654
SHEET SORTER HAVING AUTOMATIC SHEET FEED CONTROL AND RESTART
Filed April 18, 1968  13 Sheets-Sheet 8

INVENTOR
LUIS MESTRE
BY
John M Montstream
ATTORNEY.

INVENTOR
LUIS MESTRE
BY
John M. Montstream
ATTORNEY.

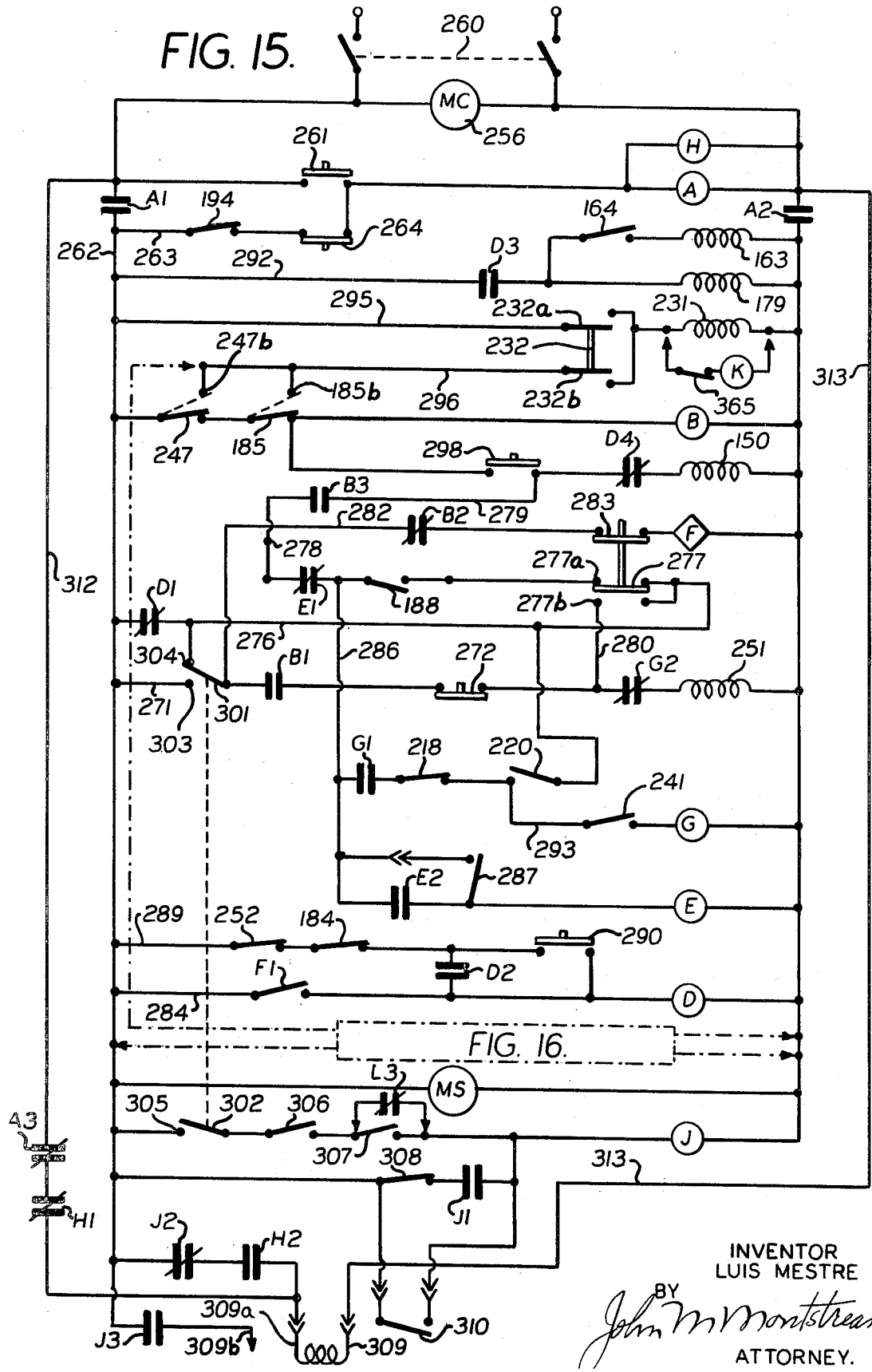

INVENTOR
LUIS MESTRE
BY John M Montstream
ATTORNEY.

June 23, 1970  L. MESTRE  3,516,654

SHEET SORTER HAVING AUTOMATIC SHEET FEED CONTROL AND RESTART

Filed April 18, 1968  13 Sheets-Sheet 12

INVENTOR
LUIS MESTRE

BY John M. Montstream
ATTORNEY.

United States Patent Office 3,516,654
Patented June 23, 1970

3,516,654
SHEET SORTER HAVING AUTOMATIC SHEET FEED CONTROL AND RESTART
Luis Mestre, Miami, Fla.
(305 E. 46th St., New York, N.Y. 10017)
Filed Apr. 18, 1968, Ser. No. 722,337
Int. Cl. B65h 29/60, 31/24, 39/00
U.S. Cl. 270—58
17 Claims

ABSTRACT OF THE DISCLOSURE

The invention relates to a sheet sorter for delivering one sheet to each of a plurality of pockets in a bin or stack means having a plurality of adjacent stacks and having automatic means to shift the stack means and restart the sorting for the next stack. The sorter is an improvement particularly on the sheet sorters of my applications S.N. 498,744 filed Oct. 20, 1965, now Pat. No. 3,356,362, and S.N. 586,152 filed Oct. 12, 1966, now Pat. No. 3,414,-256, although it is applicable to sorters of other constructions. The sorter has switching means to enable any three or any two of the stacks of a stack means having four stacks to be operated automatically and sorting restarted automatically for each stack. Switching is provided for selective use of any two or three stacks in addition to all four.

The invention has particular application in the printing of booklets in small quantities where the sorter is positioned on the delivery side of a printing press and as each sheet is printed, it is delivered to its pocket, and successive sheets to successive pockets. After one page has been printed and sorted, the press has the plate for page 2 inserted therein and the second sheet is delivered by the sorter to each of a plurality or all of the pockets and so on for all the pages of the book. The sorter herein provides a plurality of pockets, such as fifty, in stack relation in each stack and it has a plurality of stacks. The sheets are delivered successively to each pocket of a stack by a conveying means, after which the stack means is shifted to place the next stack in delivery position the delivery end of which is moved or indexed successively opposite each pocket. There are various controls for accomplishing this delivery of a sheet to its pocket as well as various selective controls for skipping a sheet to any one or more pockets so that a pocket will lack one or more of the sheets.

It is an object of the invention to construct a sorter to feed, generally a sheet in succession to each of a selected number or all of the aligned pockets in each of a plurality of stacks such that when a sheet has been delivered to the last pocket, the sorting stops, the stack means shifts automatically and sorting for the next stack begins automatically.

Another object is to construct a sorter as above but with three or more stacks forming the stack means in which for a three stack stack means selection may be made to use three or any two stacks and in a four stack stack means all four or any three or any two of the stacks may be selected for sorting.

Figure 13:
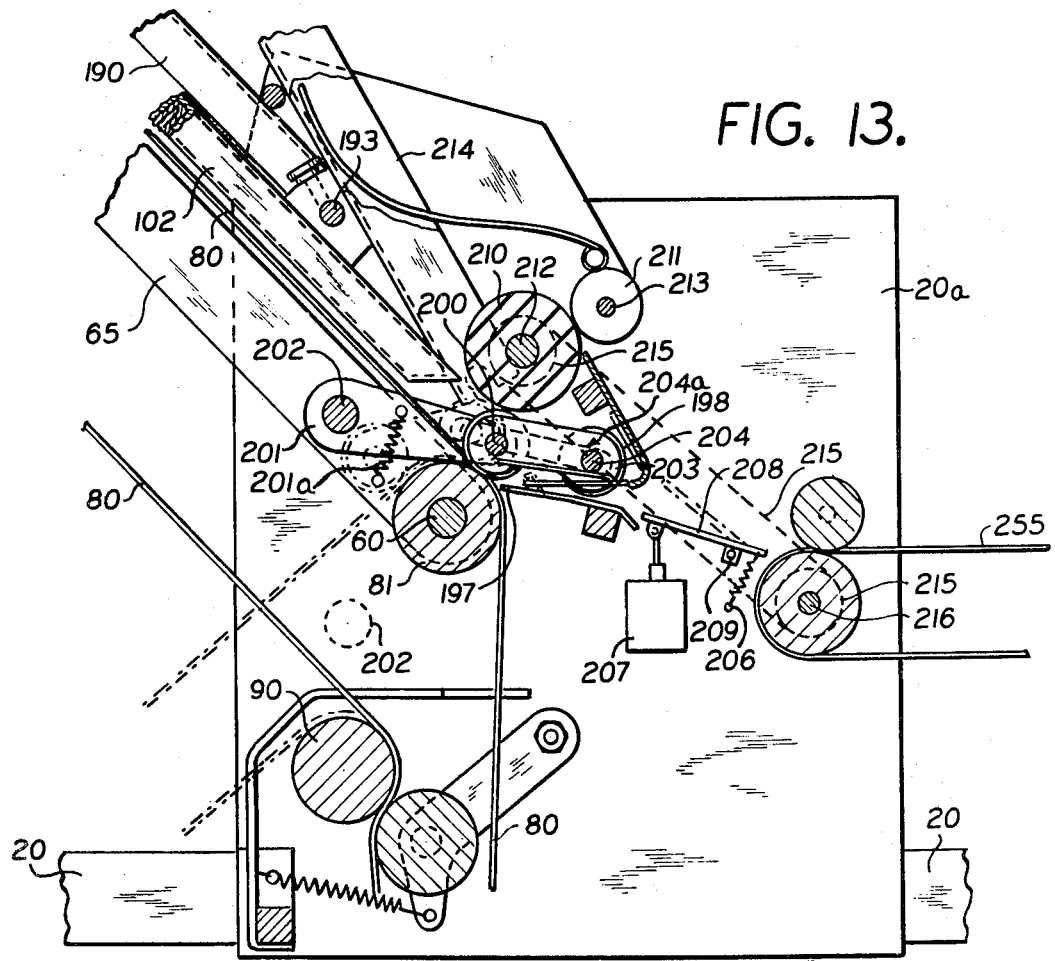
Figure 12:
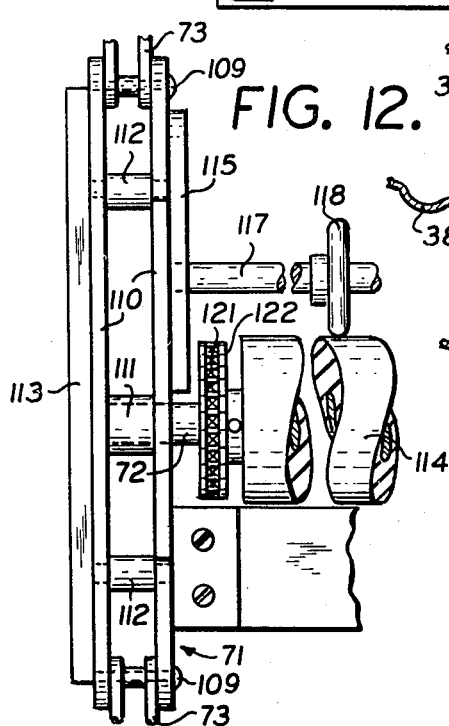
Figure 11:
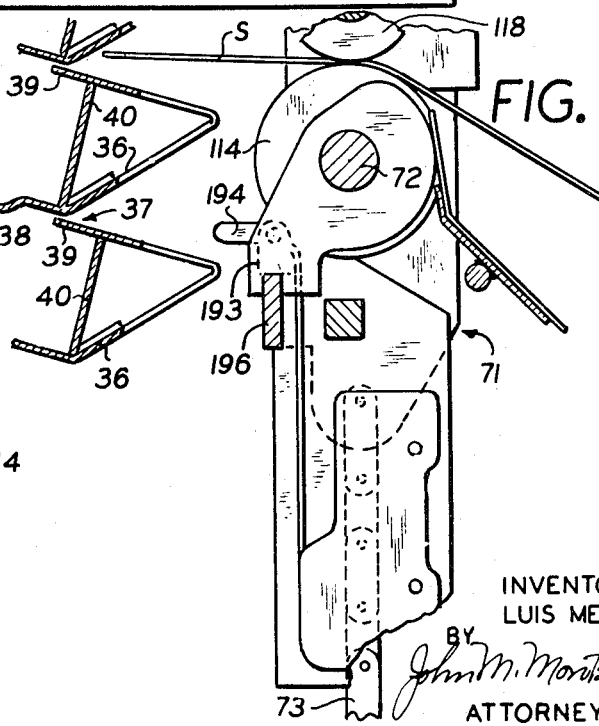
Figure 16:
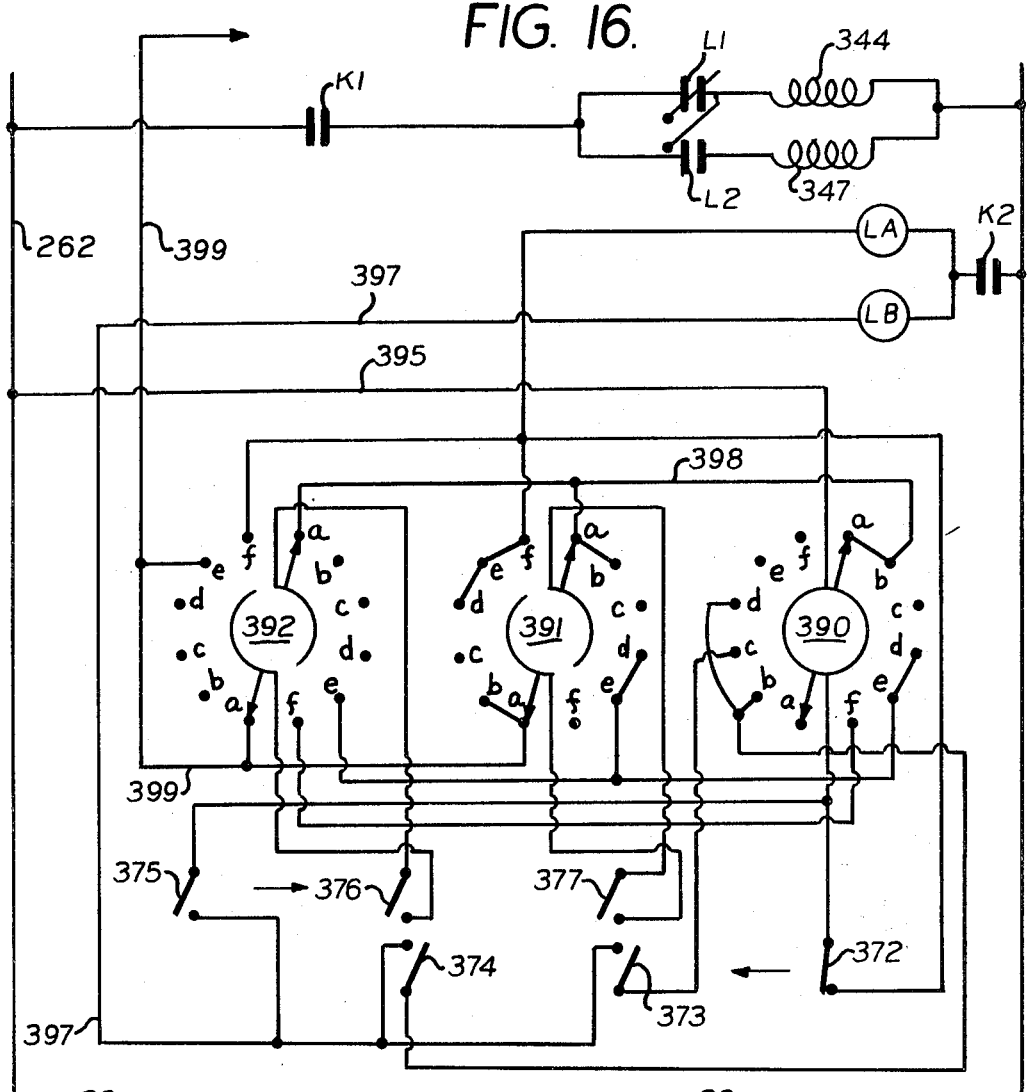
Figure 17:
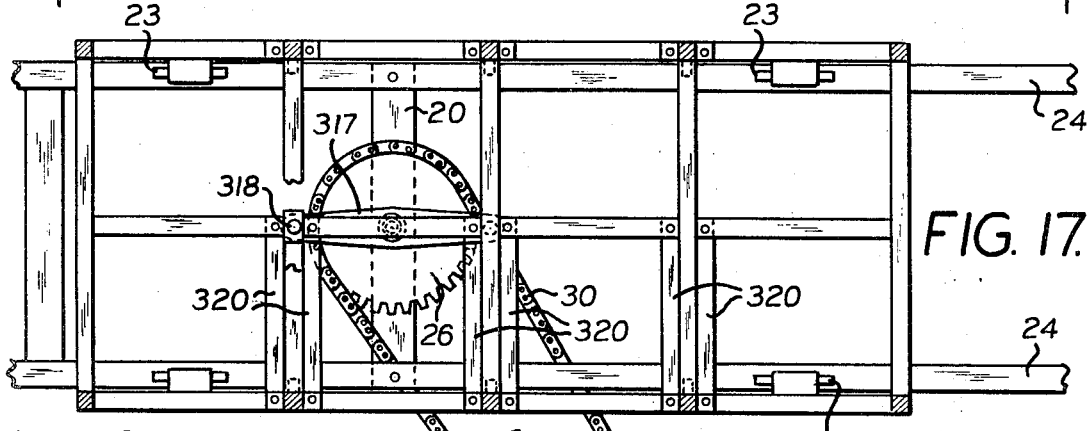
Figure 18:
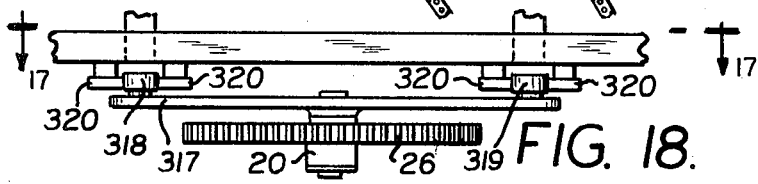
Figure 19:
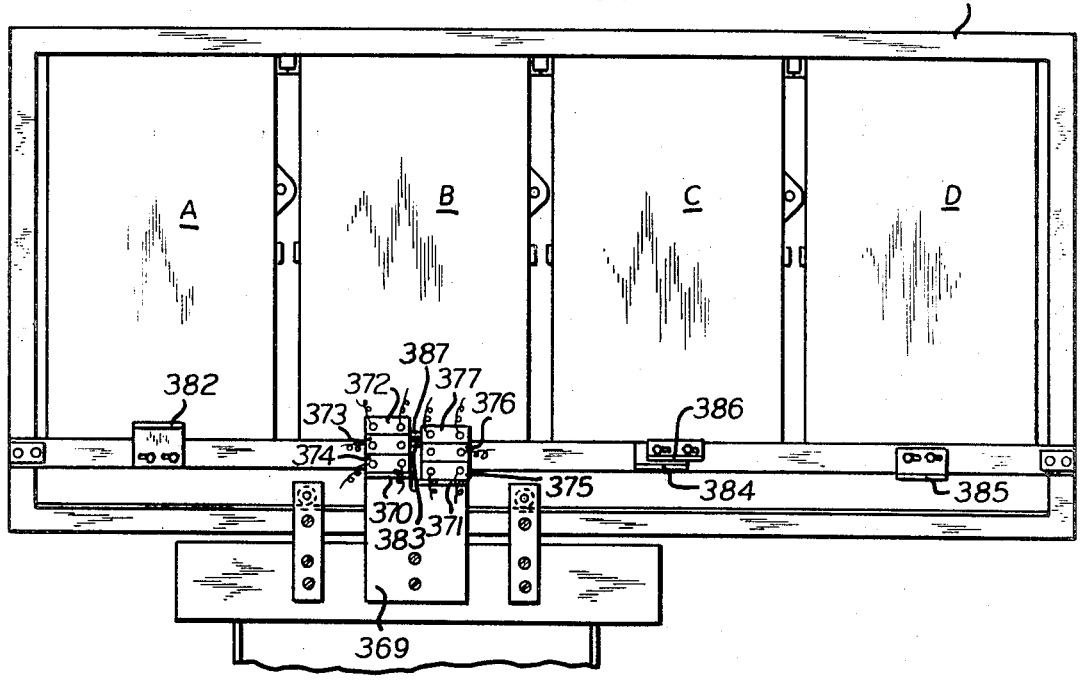
Figure 20:
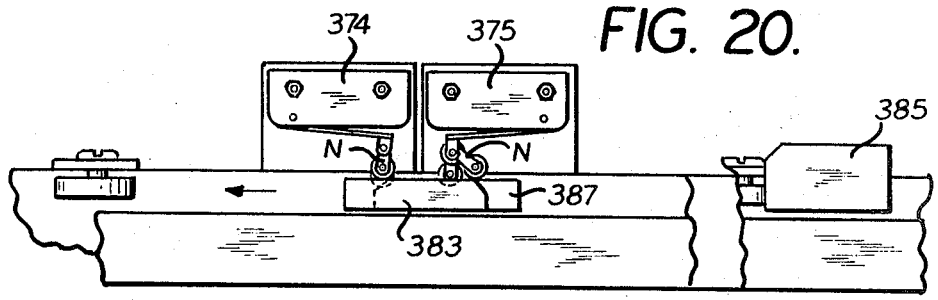
Figure 21:
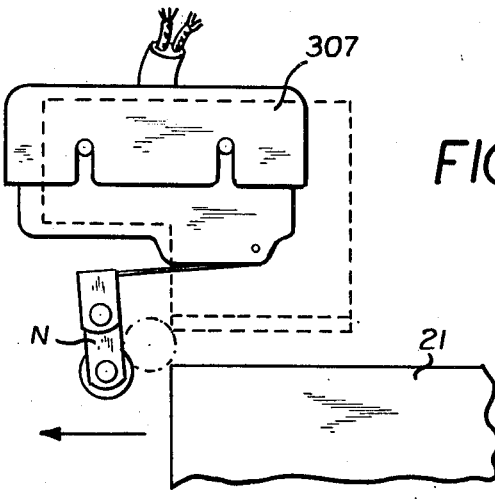
Figure 22:
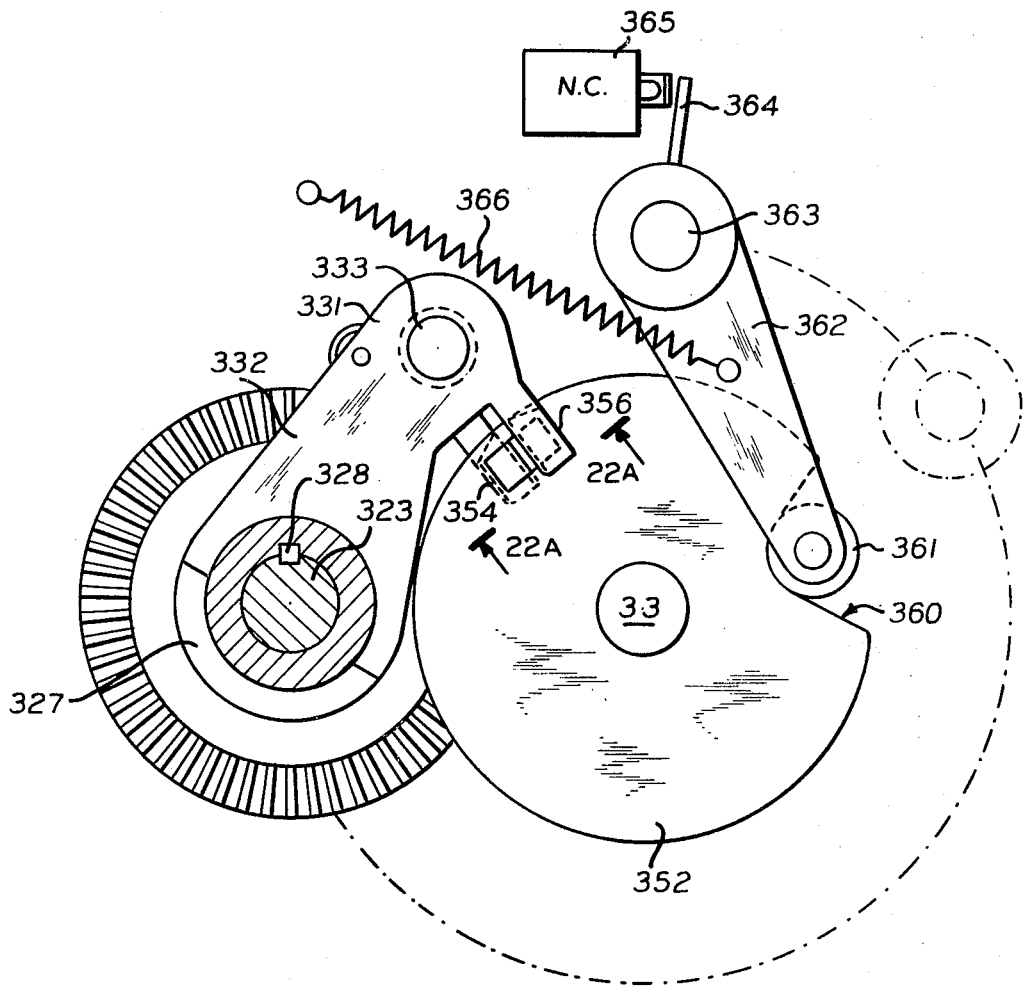
Figure 22A:
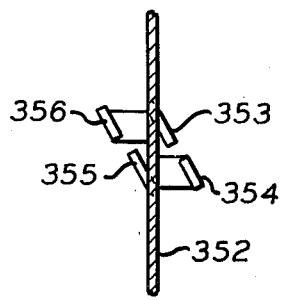

Other objects of the invention will be more apparent from the following description when taken in connection with the accompanying drawings illustrating a preferred embodiment thereof in which:

FIG. 1 is a side view of the sorter;
FIG. 2 is a top view of the sorter;
FIG. 2a is a detail view of the programmer;
FIG. 3 is a plan view of the ramp means;
FIG. 4 is section taken on line 4—4 of FIG. 3;
FIG. 5 is a view showing a sheet operated trigger for an indexing means;
FIG. 6 is an enlarged view of the delivery end of the conveying means and its raising and lowering means;
FIG. 7 is a side view of the ramp operating means;
FIG. 8 is a top view of the ramp operating means;
FIG. 9 is a top view of a clutch means for a stack means of three or more stacks;
FIG. 10 is a side view of the clutch means of FIG. 9;
FIGS. 11 and 12 show details of the delivery end of the ramp means;
FIG. 13 is a view of details of the deflector for the ramp means;
FIG. 14 shows control switches for the skip means;
FIG. 15 is a circuit diagram for a stack means having two stacks;
FIG. 16 is a circuit diagram of an addition to the circuit of FIG. 15 for a stack means having three or more stacks;
FIG. 17 is an enlarged view of the stack means showing the stack shifting means;
FIG. 18 is an enlarged side view of the stack shift means;
FIG. 19 is a top view of a stack means having four stacks with selective switch operators;
FIG. 20 is an enlarged view of the selective switch means on the stack means;
FIG. 21 is an enlarged view of a stack operated switch;
FIGS. 22 and 22a show details of the clutch for the stack shift means.

The sheet sorter includes a frame 20 of suitable form. A stack means 21 has a plurality of pockets 22 in two vertical stacks, 21a, and 21b, such as of fifty pockets each. The sorter of FIGS. 17 and 19 illustrate a stack means with four stacks of 50 pockets each. The stacks are adjacent and fixed to each other with the pockets of each stack in vertical arrangement. When the pockets of one stack is filled, or any desired portion thereof, the next stack is moved into sheet receiving position and the desired number of pages are delivered into the pockets of this stack.

The stack means is moved by power means to shift the stacks to and from receiving position when the proper number of sheets has been delivered into a desired number of pockets in the sheet receiving stack. The stack means may be mounted on wheels 23, FIG. 1, which roll on a stack track 24, FIG. 2 and positioned adjacent to or on the floor. In a two stack sorter, a bell crank lever 25 is secured to a sprocket 26 rotatably mounted on the frame 20 on a shaft 27. The bell crank lever is connected through a link 28 to a pivot 29 carried by the stack. The bell crank lever is rotated such as by a chain 30 and a sprocket 37 mounted on a shaft 23 driven by a shaft 156, FIG. 8, as will be described hereinafter.

Each pocket 22, FIG. 11, has an angular face 36 to direct the sheet through a narrow slot 37 into its pocket and projections 38 direct the sheet downwardly. A lip 39 traps the end of the sheet against any rebound. Each stack also has an adjustable and removable backstop 51, FIG. 2.

The sheets are delivered to the pockets by conveying means of any suitable construction having a sheet entry end where a printing press or sheet feeder is located or coupled thereto and a sheet directing means at the stack means to direct each sheet into its pocket. The conveying means particularly shown is a ramp means 59, as more fully described in my earlier patents, mounted on a pivot 60 which is spaced from the stack means. The ramp means extends and contracts longitudinally by having an entry section 61 and a delivery section 62 which are operatively connected together such as by clip means 63 at the end of side members 64 and similar clip means 66 extending around the edges of the side members 64. The side members 64 are secured together in spaced relation by a crossbar.

Means are provided, FIGS. 3 and 6, to extend and contract the ramp means as it pivots so that the delivery end of the ramp means is always uniformly spaced from the entry slot of each pocket. A convenient means for accomplishing this is a vertical track means 69, FIG. 3, preferably located adjacent to the stack means. The delivery end of the ramp means is provided with carriage means including a carriage 71, FIGS. 11 and 12, on each side of the ramp means which are received by the track means and connected with the ramp means by a shaft 72. Each carriage is also connected with chain means including chains 73 mounted on an upper sprocket 74 and a lower sprocket 75 which is secured to rotatable shafts 76 and 77 respectively.

The conveying or ramp means is provided with belts 80, FIG. 3, which passes over a roller 81, FIG. 13 mounted on the pivot 60 and passes over a roller 82 at the delivery end of the ramp means. Preferably, the roller 82 is spaced from the end of the ramp means. Suitable means are provided to keep these belts taut as well as to permit the belts to accommodate for the extension and contraction of the ramp means. A driving roller 90 drives the belts which roller may be driven from the main drive shaft 32, FIG. 1, by a belt 89 and a pulley carried by the belt driving roller 90.

Suitable means FIGS. 3 and 4 press the sheets into driving contact with the belts which desirably expand and contract with the extension and contraction of the ramp means. Briefly, this means includes ball cages 97 and 102, balls 98, spring means 99 and rods 100 slidable in holes 101. Belt supports 105, FIG. 4, also telescope to accommodate for extension and contraction of the ramp means. The ball cages rest on supports 106 secured to the lower elongated ball cage 102 and slidable in the cage 102 at the other end.

The conveying means may be any suitable means for conveying the sheets from a sheet receiving end to the pockets and generally directing successive sheets into successive pockets, which means includes an element or part which moves upwardly and downwardly at the pockets. In the sorter illustrated this sheet directing means is the delivery end of the ramp means 59 which is raised and lowered by ramp operating means and includes indexing means which moves the delivery end in step-by-step motion in one direction equal to the pocket spacing to bring the delivery end to each pocket. Return operating means returns the delivery end of the ramp means in the other direction to initial position. The indexing movement is shown as downwardly and return movement is upwardly although it could just as well be opposite thereto.

The ramp operating means, FIGS. 6, 11 and 12, includes the sprockets 74 and 75, chains 73 which are attached to the carriages 71 of the ramp means chains by pins 109. Each carriage may be plates 110 having a bearing 111 for the shaft 72 and spaced apart by spacer 112. Each carriage is guided by a track 69, FIG. 3, within frame uprights 20. This track also constitutes means for extending and contracting the ramp means; 113 is a wear plate. An auxiliary delivery roller 114 on shaft 72 is spaced from the upper belt roller 82. A mounting plate 115 has a generally vertical slot 116 and rest notch 119, FIG. 6 which receives a shaft 117 carrying a sheet directing roller 116 engaging the top periphery of roller 114. The roller 114, FIG. 12, is driven by sprockets 120 and 121 connected by a chain 122. Since the sheet directing roller always engages the top periphery of roller 114, each sheet is always directed horizontally into a pocket by the roller 118.

Indexing means, FIGS. 7 and 8 is connected with the sprocket shaft 77 and includes a ratchet disc 123 with having ratchet notches 124 shown in the periphery of the disc. A pawl carrier 125 is oscillatably mounted on the shaft 77 and carries a pawl 126 on a pawl pivot 127 in a position so that the pawl engages a pawl notch and turns the disc for each oscillation of the pawl carrier. A spring 128 presses the pawl into contact with the pawl disc. A pawl carrier is oscillated, such as by a crank 129 carried by a crank shaft 130. The crank is connected by a link 131 on a pivot 132 at one end and the other end of the link is pivotally connected by a pivot 133 to the pawl carrier. A nonretract or lock disc 134, FIG. 8, is secured to the shaft 77 and has notches 135 in the periphery thereof to be engaged by a lock pawl 136 pivotally mounted on a pin 137 and held against the disk periphery by a spring 138. Means are provided to raise the lock pawl when the crank starts to turn which means includes a cam surface 143 which cam surface is engaged by a roll 144 carried on the crank 129. Starting position of roll 144 is shown in dot-dash lines.

Gears 145, 146, and clutch 140 connect the main shaft 32 with the crank shaft 130 which clutch is of the type which when engaged rotates the shaft and crank for one revolution and then releases so that the one revolution of the crank oscillates the pawl carrier once so that the pawl rides on the periphery of the disc in a clockwise direction of movement of the pawl carrier and then engages a notch 124 so that on the return movement the pawl turns the pawl disk for one notch to turn the shaft 77 and sprockets 75 to move the delivery end of the ramp means to the next pocket. A one revolution clutch is well known. The clutch is engaged by a solenoid 150 under the control of a sheet moving on the ramp means, as will appear hereinafter.

Return operating means is provided for the ramp means to move the delivery end in the return direction, or upwardly in the construction shown, to initial position to again feed a sheet into the pockets of the next stack. This return operating means FIG. 8, includes a sprocket 153 secured to shaft 77, a chain 154, and sprocket 155 freely rotatable on a jack shaft 156 which jack shaft is operatively connected with the main shaft 32 through a friction clutch 160, sprocket 157, chain 158, and a sprocket 159 secured to the main shaft 32. Upon the engagement of this clutch, sprocket shaft 77 is rotated in a reverse direction. The friction clutch includes a driving clutch plate 161 secured to the shaft 156 and a driven clutch plate 162 secured to sprocket 155 and freely movable on the shaft 156. The friction clutch is engaged when the ramp means reaches one of its limits or particularly either a selected lower limit or the maximum lower limit, and is disengaged when the ramp means reaches its other selected or maximum limit of movement.

The friction clutch is operated to engaged position by suitable means, that particularly shown including a solenoid 163. Energization of this solenoid pulls a clutch operator 166 to the right through a spring 167. Clutch operator 166 is connected by and mounted on a pin 168 on a clutch lever 169 which is pivotally mounted on pivot 170 carried by the frame. A square or cam 171 is turned by the lever 169. The cam lies between a thrust bearing 172 fixed to the shaft 156 and a thrust bearing 173 slidable on the shaft to press the driven clutch plate 162 into driving contact with the driving clutch plate 161 and thereby rotate sprockets 155, 153, and sprocket shaft 77 in a reverse direction from that of indexing to return the ramp means to initial position.

Pawl lifting means, FIG. 7, are provided to raise the pawl when the ramp means is returned to initial position. This means includes a pawl lift lever 176 mounted on a pivot 177 which lever carries an arcuate lift car 178 located adjacent to the pawl to engage a lift pin 181 carried thereby. A solenoid 179 is operatively connected with the lever by a pin 180. When the solenoid is energized, the lifting car moves downwardly against tension of the spring 128 out of contact with the pawl disc 123 so that the disc may rotate clockwise upon return movement of the ramp means.

Ramp switch means are provided on the frame to halt the ramp means at its two maximum limits of movement which, however, are safety limit switches when a programmer is provided. The ramp limit switch means includes an upper switch 184, FIG. 6 and a lower limit switch 185 both carried by the frame which is engaged by ramp means structure such as a limit switch pin 186 carried by the ramp side bar 64. If a programmer is not provided, then preferably at least one limit switch is adjustable such as the lower switch upwardly, so that for a book of less than 50 sheets, the ramp means need not travel to the full available movement. If both limit switches are adjustable, then any set of pockets are available. Switch 184 is connected with solenoid 163 and pawl lift solenoid 179 through a relay D and contacts D3 to engage the friction clutch 161, 162, and opening of switch 184 breaks the two circuits 289 and 292, FIG. 15.

With a ramp means, indexing control means, FIG. 5, is provided to control the normal sorting operation of the indexing means which includes a trigger switch 188 having its trigger 189 in the path of each sheet moving along the conveying means. The leading edge of the sheet preferably, operates the trigger switch. The switch is electrically connected with the indexing solenoid 150, FIGS. 8 and 15. Switch 188 preferably is adjustably mounted in a slot 191 in a bracket 190, and locked in position by nut 191a, which gives sufficient adjustment of the timing in the operation of the indexing means as will appear. Indexing limit switch 185 breaks the indexing circuit 171 through relay B and contacts B1.

Safety means are provided to stop the movement of the ramp means in the event that a sheet has not sufficiently entered a pocket. This means includes a safety switch 198, FIG. 11, carried by the ramp means such as by a carriage cross bar 196 and having an operating lever 194. If a sheet sprockets just a short distance from its pocket, the lever may push it completely into the pocket. If, however, a sheet is jammed, it is engaged by the lever which opens the safety switch and stops the operation of the sorter. Also in the event that a sheet fails to enter its entry slot in its pocket, the sheet will fold upon itself and engage the lever of the safety switch to open the switch and stop the sorter. This safety switch is now mounted on stationary roller shaft 117.

Since the ramp means is at different angles at the entry end, it is desirable to have an entry pressure roller means which includes rollers 197 and 198, FIG. 13, rotatably mounted on the rods 200 and 204, respectively. Roller 200 moves over the surface of the belts 80 passing over roller 81 and roller 198 moving to and over roller 81. Rod 200 is carried by links 201 pivotally mounted on a pivot 212 carried by the ramp side members 65. The entry pressure roller rod 200 has a link 203 on each end thereof receiving the end of the rods 204 and 200 hence movable with pull rod 202. The ends of rod 204 are received in a slot 204a carried by frame plates 20a. A spring 201a pulls the links 201 and roller 197 downwardly.

It is desirable to be able to remove one or more sheets at the entry end of the ramp means to examine the printing on the sheet before sorting begins. A deflector or gate 208, FIG. 13, is pivotally mounted on a rod 209 to tilt into the path of a sheet and direct it between feed rollers 210 and 211 mounted on shafts 212 and 213, respectively, and deposit the sheet in a tray 214 where it can be picked up and examined. The roller 210 is driven by a sprocket and chain connection 215 from a shaft 216 of a receiving conveyor 255, which desirably is pivoted on the shaft 216.

The deflector 208 serves both as a proof deflector and a skip control deflector. The skip control means for the deflector includes a skip switch 241 on a programmer 235, to be described, a normally open switch 220 having a switch closing feeder 221, a relay G and its normally closed contacts G2 in series with the deflector solenoid 207. Since the skip sheet is deflected by the deflector 208, the indexing trigger 189 is not actuated to close the indexing switch 188. Skip indexing means is provided in a circuit connected with the indexing circuit including the switch 220, a switch 218 having a feeler 219 and relay contacts G1. Both feelers are located in the path of a sheet passing along the sheet receiving conveyor 255. The switches are carried by a bracket 222 mounted on crossbars 223 secured to the frame 224 of conveyor 235.

Power means are provided to shift the stack means of a two stack unit to and from loading position. A power takeoff is provided from shaft 156 through gears 226, 227, 228, 229, to shaft 33. A clutch 230, which is well known connects the gear 229 with the sprockets 37 and 25 providing a 1 to 2 ratio for a two stack construction, so that the crank 25 is rotated 180 degrees for each revolution of sprocket 37. A solenoid 231 engages the one revolution clutch which is energized at will or automatically by a switch 232, FIG. 15, as will be described.

A suitable programmer is provided for control of the operation of the sorter. The programmer shown includes a rotary control disc 235, FIG. 2A, having skip control means shown as a pin 236 for a plurality of and preferably for each pocket in one stack. Each pin is conveniently of that known type which when pressed inwardly, stays in until it is pulled outwardly. When the control means includes a switch the pins are switch operators. The disc is driven by a gear 237 and a pinion 238 which is suitably connected by sprockets and chains 239 with the power sprocket shaft 77 for the ramp means so that the control disc makes a step-by-step partial revolution equal to the space between pins 236 or about a full revolution for each full step-by-step or downward cycle. A skip switch 241 is located to be operated by any control pin which has been pushed down to operative position and when it reaches control position for its particular pocket. Closing of this switch conditions a skip circuit for energization of solenoid 207 to shift the deflector 208 into the path of a sheet and deflect it to tray 214.

The programmer also includes a series of holes or sockets 242 at a different radius, one for each pocket. A switch operator or pin 243 is provided for one of the holes and preferably it is mounted on an arm 244 which is freely turnable on the shaft 240 for selection of any hole 242. The switch operator 243 is pulled outwardly whereupon it may be shifted to any other hole 242 where it will engage the programmer operated limit switch 247 which is a down limit switch for the ramp means. With this limit switch on the programmer, limit switch 185 on the frame serves as a safety switch in the event the operator fails to insert switch operator 243 in a hole where it can operate the programmer limit switch 247.

The programmer may also include a third set of holes 249, one for each pocket into which a switch operator or pin 250 may be inserted. This switch operator, preferably also, is carried by an arm 251 freely turnable on the shaft 240. This switch operator is pulled out of its hole whereupon it may be shifted to another of this series of holes. When the switch operator is in a hole, it will engage and operate up limit switch 252. This limit switch 252 and its operator also serves for zoning. For example, for a twenty page book pockets 1 to 20 may be used for one page and then any twenty of the pockets 21 to 50 may be used for a second page so that the pocket stack is zoned in any desired arrangement. Similarly with two or more stacks each stack may be zoned for 26 or more pockets for a single page.

Since the press structure and the sorter are shown as separate units, an auxiliary conveyor 255 is provided to receive a sheet from the press and deliver it to the sorter. It is convenient to have this conveyor driven by a separate motor 256 connected with shaft 216 by belt 257 and suitable pulleys. This conveyor also serves as the location for the skip switches 218, 220, FIG. 14, which are spaced apart and control a circuit which diverts a sheet from the ramp means into the tray and although this sheet does not engage the trigger 189, an indexing of the ramp means occurs nevertheless as will appear.

The circuit is illustrated in FIG. 15 and includes manual power switches 260 for connecting the circuit with the power lines. Closing of the switches 260 energizes the conveyor motor 256 and drives the belt conveyor 255.

The sorter is started by closing a manual starting switch 261 which energizes relay A and closes its contacts A1 and A2 to energize main circuit wires 262. Relay H, in shunt with relay A, is also energized. Relay A has normally closed contacts A3 and relay H has normally closed contacts H1 in series in a circuit including wire 300 connected on the power side of contacts A1 and an interrupt solenoid 301 on the press or feeder and controlling the feeding of sheets therefrom. Hence when relays A and H are deenergized solenoid 301 is energized. A holding circuit is provided by a wire 263 and a normally closed stop switch 264 which is connected in series with relays A and H to hold them energized. Opening of stop switch 264 stops the sorter motor by deenergizing relays A and H which opens contacts A1 and A2 and closes contacts A3 and H1 which halts the feeding of sheets.

The wires 262 are connected with the sorter motor SM so that the main shaft 32 is driven as well as the endless belt means 80. Energization of the wires 262 also closes a circuit through wire 267, the bottom limit switch 185 on the frame, limit switch 247 of the programmer and relay B. Relay B operates to close contacts B1 and B3, and open contacts B2, the purpose of which will be to appear hereinafter. If one or more proof sheets are wanted for deposit in the tray 214, the press is operated to deposit one or more sheets on the conveyor 255 and switch 272 is opened to deenergize the deflector solenoid 207 and the deflector is held in its raised position by spring 206 to deliver printed sheets into the tray after which the switch 264 is operated to stop the sorter motor SM. This deenergizes relays A and H to open contacts A1 and A2 and close contacts A3 and H1 to energize the interrupt solenoid 301. The circuitry of Pat. 3,356,362 and application SN 586,152 is slightly different, however, the construction herein is applicable thereto without change. Operation is slightly different herein in that the sorter motor, preferably, is stopped after obtaining proof sheets.

If the proofs are satisfactory, the manual switch 261 is again closed which again energizes relays A and H and opens contacts A3 and H1 to deenergize the interrupt solenoid 301 so that sheets are fed. A circuit is energized including wire 271, contacts B1, switch 272, contacts G2 and deflector solenoid 207 to pull the deflector 208 down to pass the sheets to the ramp means. The switch 272 may be opened to deenergize deflector solenoid 207 so that sheets are delivered into the tray for examination. Closing of switch 272 restores sorting.

The sheets are now delivered one at a time in spaced relation to the ramp means and travel to the delivery end thereof. In this passage of sheet, an indexing circuit is energized through wire 276, through normally closed contacts D1, switch 277, sheet triggered switch 188 on the conveying or ramp means, normally closed relay contacts E1, wire 278 now closed contacts B3, wire 279, contacts D4 and indexing solenoid 150. The solenoid releases the one revolution clutch 149 to turn the crank 129 through one revolution to index the delivery end of the ramp means to the first pocket and the sheet is delivered therein. The second sheet goes through the same cycle and the sheet is delivered into the spaced pocket and so on.

The downward movement of the ramp means also turns the control disk 236 of the programmer in a clockwise direction and turns the arm 244 therewith. Depending upon the hole 242 in which the switch operator 243 is inserted, which is dependent upon the number of pockets to receive a sheet, the lever is turned until switch operator 243 opens limit switch 247 and relay B is deenergized. A delay circuit is provided including wire 282 now closed contacts B2, a hold switch 283, and a relay F. Relay F is a time delay device, that is, it may be a delay relay or it may be a motor driven timer, both of which are known, which delays closing of the contacts or switch F1 for a period long enough to complete the delivery of the last sheet from the ramp means. The delay is a matter of about one-half second. The time delayed switch F1 is in a circuit including wire 284, the switch F1, and relay D to delay energizing of this relay and hence retain the contacts D1 closed in the indexing circuit 276 to complete the delivery. Upon termination of the delay period, switch F1 closes momentarily and relay D is energized which closed a holding circuit through contacts D2. Contacts D1 and D4 are opened to break the indexing circuit through switch 188 and manual indexing switch. Contacts D3 are closed to energize the pawl lift solenoid 179 and close switch 164 and energize solenoid 183 to return the ramp means to its other, or up, position whereupon limit switch 252 opens to deenergize relay D and halt the ramp means at its up position either top position or below top position depending upon the location of limit switch operator 250.

It is desirable to provide a nonrepeat circuit for the trigger circuit in the event that a sheet should be stacked underneath the trigger switch which would otherwise repeat the indexing. A nonrepeat circuit includes a wire 286 connected behind the trigger switch, a nonrepeat switch 287, FIG. 7, which is located to be engaged and closed by the crank link 131 about the time that the indexing is half completed. Closing of switch 887 energizes relay E so that contacts E1 in the trigger circuit open and contact 32 close to provide a shunt hold circuit around switch 287 to maintain relay E energized. It remains energized until trigger switch 188 opens whereupon relay E is deenergized to restore the indexing circuit 276 to operative condition.

Switches 277 and 283 are switches which are manually opened and are used, if it is desired, to put more than one sheet into one pocket. These switches hold out the indexing circuit until the desired number of sheets have been deposited in one pocket whereupon closing of these switches restores the indexing circuit to operative condition and indexing of the ramp means continues. Switch 277 is a double throw switch so that opening the indexing circuit at contact 277a, also closes contacts 277b to energize circuit 280 and continue energizing deflector solenoid 207.

If the operator should fail to put the switch actuator 243 into a hole, the down limit switch 247 will not be opened. If this should occur, then when the ramp means reaches its bottom position, the ramp limit switch 185 on the frame is opened to halt movement of the ramp means. It is clear, however, that without the programmer, control of the downward movement of the ramp means could just as well be achieved by adjusting the position of the switch 185 on the frame in the event all of the pockets are not to receive a sheet or remain at the bottom in the event that all the pockets are to receive a sheet. In the circuit illustrated with a programmer, the limit switch 185 is fixed and serves as a safety switch. Similarly, if a programmer is not provided, the upper switch may be adjustable for zoning, that is, a first page of a twenty-page book may be inserted in pockets 1 to 20 with the lower limit switch so positioned and a second page inserted in pockets 25 to 45 with the upper limit switch so positioned to halt raising of the ramp means at pocket 25.

The ramp means may be returned to its initial position, such as top position by manually closing switch 290 to close the return circuit including wire 289, top limit switch 184, the disk controlled limit switch 252, switch 290, and relay D. This is used generally only when sheets are not being handled for testing operation or if an automatic return is not provided. Energization of the relay D closes holding circuit contacts D2 so that relay D remains energized until up limit switch 184 or 252 is opened as described, which deenergizes relay D to restore the contacts D1, D2, D3, D4 to their initial condition.

Energization of the relay D closes contacts D3 in the return circuit 292 to energize the pawl lift solenoid 179, which closes switch 164 and energizes solenoid 163 to engage the friction clutch 161, 162. In order to assure that the pawl 126 is lifted before the friction clutch for the return movement is operated, it is desirable to provide the switch 164 in series with return solenoid 163 and closed by the pawl lift lever 176.

At times, it is desired that a sheet not be delivered to one or more pockets. A skip means is provided including a skip circuit controlled by the skip control pins 236 on the disk 235. This skip circuit includes contacts D1, wire 276, a second feeler switch 220, wire 293, skip switch 241, and relay G. Energization of this relay opens contacts G2 and deenergizes solenoid 207 and deflector 208 is raised into the path of a sheet which is delivered into the tray 214. The skip means also includes a skip indexing circuit including switch 220 which is opened by a sheet but closes upon passage of the sheet and a first feeler switch 218 which is closed by the sheet, and contacts G1 which circuit shunts trigger indexing switch 188. This circuit is described in detail in application Ser. No. 586,152 filed Oct. 12, 1966. Opening of switch 220 by passage of the sheet, deenergized relay G which closes contacts G2 and reenergizes the deflector solenoid 207. Opening of switch 241 when the programmer moves with the indexing restores the circuitry.

With a multiple stack means having two or more stacks, the next stack is moved into delivery position and the sorting process repeated. When all stacks, which are to receive sheets, have received their sheets, the first stack is usually, though not necessarily the first for a three- or four-stack unit, then moved to sheet receiving position, the plate is changed on the press, or a pile of another page is placed on the feeder and the sorting is repeated. The stack means is shifted by power with either manual or automatic control, manual control of the shift is accomplished by a stack shift circuit including a wire 295, switch 232a, solenoid 231 which engages a one revolution clutch 230 and rotates crank 25 through 180 degree to shift the stack. Switch 232 is a switch of the type with a center position so that switch 232a is spring opened upon release. The shifting of the stack, however, is completed because of the one revolution clutch 230.

To shift the stack automatically, switch 232 is operated so that switch 232b is closed. The switch is constructed to remain in this position and such switches are well known. Switch 232b is connected in a circuit including wire 267, limit switch 185 and its contact 185b or limit switch 247 and its contacts 247b, wire 296, switch 232b and stack solenoid 231. When one of these limit switches is openend, usually switch 247 on the programmer disc 185, the circuit is closed through the solenoid 231 on which engages the one revolution clutch 230, FIG. 8, and the stack is automatically shifted. At the beginnig of the upward movement of the ramp means, the switch 247 is released from contact 247b and switch 247 returns to its normally closed position so that the circuit 276 is ready for indexing into the second stack for a stack means of two stacks or the next stack for a stack means of more than two stacks. At the bottom position of the ramp means for the second stack of the two stack means, the operation repeats to return, manually or automatically, the first stack to sheet receiving position. It will be noted that the stack means is shifted automatically solely with one of the bottom limit switches and not with an upper limit switch as it well could be by substituting switch 185, 185b for switch 184 and switch 247, 247b for switch 252. In the arrangement shown the stack means is shifted with the return movement of the ramp means so that there is a saving of time.

The trigger switch 188 is adjustable along the ramp means in the slot 191 in the bracket 180. It is moved nearer the delivery end for long sheets and towards the entry end for shorter sheets. The reason for this is to give a long sheet a little more time to enter its pocket before the next sheet indexes the ramp means. For a short sheet the trigger switch 188 is moved to the lower end of slot 190 so that the sheet closes the trigger switch 188 sooner and an earlier operation of the indexing means. This spaces the indexing signals farther apart between trigger switch 188 and the first feeder switch 216 for a following skip sheet passing to the tray.

It has been mentioned that switch 277 is depressed in order to put one or more additional sheets in any pocket by breaking the indexing circuit. If it is the last pocket which is to receive a plurality of sheets, the opening of the limit switch 185 or 247, deenergizing of relay D and closing of contacts B2 in the timer circuit would present a problem. It is for this reason that operation of the switch 277 to open contact 277a, also closes contacts 277b and keeps the circuit through wire 280 and deflector solenoid 207 energized so long as switch 277 is held depressed or switch 277, 277b remains closed. When released, switch 282 closes and since relay B is deenergized, and contacts B2 are closed, the timer circuit 282 is closed and timer F times to function and after its timed delay it momentarily closes switch F1 to energize relay D, close hold contacts D2, and contacts D3 in the ramp return circuit 292. The ramp continues return movement until return limit switch 184 or 252 is opened to break the circuit to relay D. Opening of contacts D1 and D4 in the indexing circuit 276 renders this circuit inoperative during ramp return movement.

The speed of the belts 80 is such that a sheet is delivered to its pocket before the next sheet operates the trigger switch 188. The ramp means 59 and the receiving conveyor 255 constitute conveying means to receive a sheet at the sheet receiving end of the conveyor means and normally deliver the sheet to a pocket. The sheet deflector is located between the ends of the conveying means.

It is desirable that the sheet sorter be fully automatic that is, when the stack means or bin is shifted to move the second or the next stack into sheet delivery position and the ramp has returned to its initial position, the feeding of sheets is automatically restarted to insert a sheet into each of the pockets of the second or next stack. This is accomplished for a stack means having two stacks with the circuitry shown in FIG. 15.

It is desirable also that there be selective manual or automatic restart which is secured by the switches 301 and 302 which are ganged to operate together. Switch 301 has a contact 303 directly connected with the power line 262 for automatic restart and a second contact 304 for manual restart which is connected to power line 262 through the contacts D1. Switch 302 for manual start is open.

For stack means having two stacks, automatic restart means, FIG. 15, includes switch 302 which closes a restart circuit through a restarting switch 306, FIG. 2A, which is operated by the programmer or control disc and is closed about nine pockets before the disc returns to its initial position. This programmer restarting switch is connected in series with a stack switch 307, FIG. 21, and a relay J. This stack switch is operated by the stack means such as by a part of the stack means frame practically as soon as it moves to place the second stack in sheet receiving position and remains closed until the return movement of the stack means. This stack switch has a knee N such that when the stack means starts on the return movement the knee buckles and opens the switch. Upon energization of relay J the contact J1 close in a holding circuit from the power line 262 which circuit preferably includes a so called count switch 308 in series with the contacts J1 and opened by the programmer. This count switch is set to be opened by the programmer when about 2 pockets from the last pocket to receive a sheet and relay J is energized.

The manual and automatic restart operation of the sorter must also control the sheet feeder of the printing press or of the sheet feeder which is coupled with or located to feed its sheets to the sorter. An illustrative sheet feeder is described in the Mestre application S.N. 652,814 filed July 12, 1967. This control is secured by an interrupted solenoid 309. This solenoid is carried by the printing press and controls the sheet feeding means of the press or is carried by a sheet feeder and controls the feeding of sheets by the sheet feeder. The connection shown is for a press because upon energization of solenoid 309, sheets are not fed to the printing press and hence not delivered to the sorter. When the sorter is to be coupled with a sheet feeder, such as the Mestre feeder, the interrupt solenoid 309 is energized to feed sheets and hence the connection 309a of the solenoid is shifted to connection 309b. It is clear that it is immaterial for either a press or a sheet feeder whether the solenoid 309 is energized or deenergized in order to halt the feeding sheets. The circuitry shown with contact 309b is suitable for either operation.

For an interrupt solenoid which is deenergized in order to feed sheets, such as for a press, the circuit for the interrupt solenoid 309 is connected on the power side of contacts A1 and A2 through a wire 312, normally closed contacts A3 and H1 connected in series with one side of the solenoid. The other side of this solenoid is connected by a wire 313 to the ground or neutral line on the power side of contacts A2. Normally closed contacts H1 are controlled by relay H which shunts relay A. When the main switch 260 is closed, the interrupt solenoid is energized through wire 312, and closed contacts A3 and H1 and sheets are not fed to the press and hence not to the sorter. When the starter switch 261 is closed relays A and H are energized which opens contacts A3 and H1 so that this circuit to the interrupt solenoid is opened. However, relay H is now energized and a shunt circuit to the interrupt solenoid 309 is now connected from line 262 through normally closed contacts J2 and the now closed contacts H2 so that solenoid 309 is still energized and sheets are not fed to the press. Upon closing of the switch 310, which shunts the count switch 308 and open contacts J1, relay J is energized and held energized by a hold circuit through count switch 308 and now closed contacts J1 so that contacts J2 now open to deenergize the interrupt solenoid 309 and sheets are fed to the press. Sheets are printed and sorted until count switch 308 opens which deenergizes relay J so that contacts J2 close to energize interrupt solenoid 309. Switch 310 is closed to print and sort sheets to the second stack in which the sorting operation described is repeated. The double arrows indicate prong and socket means for a cord of five wires which connects the sorter circuitry with the press or sheet feeder. Switch 310 need not be located on the press or sheet feeder.

When on manual restart, it is desirable that the circuit for the deflector solenoid 207, the trigger switch 188, the timer relay F, the skip means 241, the skip index 218, the non-repeat means 287 and the multiple sheet switch 277b are broken on the return movement of the ramp means which is accomplished by opening of the contacts D1 which remain open until limit switch 184 or 252 open.

For automatic restart switch 301 engages contact 303 and switch 302 engages contact 305. Restart switch 306 is open and the stack switch is open. When sorting to the first stack is completed, the stack means shifts and the stack switch 307 is closed thereby but the restart switch 306 on the programmer disc is open and closes when the ramp means is adjacent to the end of its return movement. Closing of the restart switch 306 closes the restart circuit and relay J is then energized to close the hold contacts J1 and open contacts J2 and the interrupt solenoid 309 becomes deenergized to again feed sheets to the press. When sorting to the second stack has been completed and the desired number of sheets have been delivered thereto, the count switch 308 opens which de- energizes relay J which opens holding contacts J1 and closes contacts J2. Since contacts H2 are closed the circuit is now completed to the interrupt solenoid so that the feeding of the sheets to the printing press is halted. Upon return movement of the stack means the first stack is returned to initial or delivery position. The plates on the printing press are changed and switch 310 is again closed to start the cycle of automatic feeding of page 2 to the pockets of the two stacks and the return of the stack means and ramp means to initial position. This continues for each page of the book.

If it is desired to couple to the sorter, a sheet feeder of the Mestre type set forth above, the plug 309a for the interrupt solenoid is disconnected and connected with socket 309b having normally open contacts J3 therein. With a feeder such as described, the interrupt solenoid 309 is energized to feed sheets to the sorter and is deenergized to halt the feeding of sheets which is the reverse of that for the printing press described. Upon closing of switch 310, which preferably is on the feeder, relay J is energized to close contacts J3 whereupon interrupt solenoid 309 is energized to feed sheets. Other than this, the cycle for the feeder duplicates that for the press described above.

FOUR STACK

With a stack means having three or more stacks, such as the four stacks shown in FIG. 17, a slightly different stack shifting means is used although basically the same. This shifting means includes a stack operating lever 317, FIGS. 17, 18, rotatably mounted on the frame 20 beneath the stack means. The stack operating lever is secured to the sprocket and rotated thereby. This lever has arms extending in opposite directions from the sprocket center and adjacent to the end of the one arm is a roller 318 and adjacent to the other end of the other arm is a similar roller 319. These rollers engage in a channel formed by spaced plates 320 carried by the bottom of the stack means and the channels are spaced apart the distance in which the stack means moves or the width of a stack and serve to shift the next stack into sheet receiving position with respect to the conveying means. For a stack means having four stacks there are three such channels, that is, the number of channels is equal to the number of stacks minus one. The center of the stack shifting lever or the shaft 27 is on a line extending longitudinally of the stacks within the ends of the channels so that when the lever is rotated through 180 degrees one roller comes out of the end of its channel as the roller on the other arm moves into its channel and thereby shifts the stack means. The position of the stack shift lever illustrated in FIG. 17 is at right angles to the channels, so that the lever and its rollers within the channels anchor the stack means in delivery position for each stack. Rotation of the stack shifting lever in one direction shifts the stack means forwardly from the first stack to the second, then to the third and finally to the fourth. Reverse rotation of the stack shifting lever shifts the stack means in the opposite direction.

Suitable means may be used to rotate the stack shift lever 317 through 180 degrees. The mechanism, FIGS. 9 and 10 for shifting the stack means to bring another stack into alignment with the ramp means when the pockets of a preceding stack have been filled with sheets is a mechanical means and uses a two directionally or a reversing clutch. The clutch is connected with the shaft 156 of the sorter on which is secured the pinion 226. A forward gear 227 is freely rotatable on a clutch shaft 323 which gear meshes with one side of the pinion and a return gear 324, also freely rotatable on the clutch shaft meshes with the other side of the pinion so that these two gears are constantly rotating in opposite directions. It is immaterial which gear is a forward gear and which is the return gear just so long as the forward gear turns the stack shaft lever in a counterclockwise direction as viewed in FIG. 17 for a stack means having a forward direction of shift as described.

A toothed clutch disc 325 is secured to the inner face of the forward gear and a similar clutch disc 326 is secured to the inner face of the return gear. A clutch element 327 is slidably mounted on the clutch shaft 323 between the two clutch discs and having a neutral or disengaged position between the two clutch discs on the gears. This clutch element has cooperating clutch discs on opposite faces to engage the teeth of the cooperating clutch discs 325 and 326. The clutch shaft 323 is mounted so that it may slide on the shaft into engagement with either clutch disc on the gears and have a driving connection with the clutch shaft. The gear 228 is fixed to the clutch shaft and meshes with the gear 229 secured to shaft 33 which carries sprocket 37.

Clutch operating means is provided to shift the clutch element into engagement with the clutch disc of either gear. This means includes a clutch lever 331, FIG. 22, having a fork 332 engaging the clutch element and this lever is secured to a clutch shift rod 333 which is slidably mounted in the frame 20. This rod and clutch element is shifted to bring the clutch element into engagement with the clutch disc of the forward or return gear. The shift rod is connected by a link 334, FIG. 10, with a shift lever 335 which is pivotally mounted on the frame on a pivot 336. A releasable retaining lever 337, pivoted on pin 338, carries a retaining roll 339 on a pin 340. The roll rests on one of the retaining notches 341a or b or c carried by the shift lever 335 to releasably retain this lever and hence the clutch element 331 on one of its three positions namely neutral position or in engagement with the clutch disc 325 or 326. A solenoid 344 is connected with the shift lever through a spring 345 connected to bring a pin 346 on the shift lever to shift the clutch rod 333 downwardly to bring the clutch element 332 into engagement with the clutch disc 325 of the forward shifting gear 227. A solenoid 347 shifts the lever to move the clutch element 327 in the opposite direction or upwardly to bring the clutch element into engagement with the clutch disc 326 on the return gear 324. Solenoid 347 is connected with the pin 346 by a spring 348.

Means are provided to disengage the clutch element 327 when the stack means has been shifted and brought another stack into alignment with the conveying means. This clutch disengaging means includes a cam disc 352, FIG. 22, having a cam 353 on one face thereof so that when the cam disc has made one complete revolution the cam comes into contact with the clutch lever or an arm 354 thereon to move the clutch element in one direction to neutral position to disengage the clutch element from the clutch disc. A similar cam 355 on the opposite face engages the clutch element or an arm 356 thereof and moves the clutch element in the other direction to central position and disengage the clutch element from the other clutch disc. Disengagement of the clutch element halts rotation of the stack means shift lever 317 with a stack in alignment with the conveyor means.

Safety means is provided to assure that relay K is not energized when the stack means shifts. This safety means includes a notch 360 in the periphery of the cam disc 352 in which is received a roll 361 carried by a switch lever 362 which is pivoted on a pin 363 mounted in the frame. The switch lever carries a switch pin 364 which is positioned to close a switch 365 when the notch roll rests in the notch 360 of the cam disc. When the cam disc rotates, the roll is propelled to the periphery of the disc and the switch lever moves the switch pin into engagement with the switch 365 to open the same. This switch, FIG. 15, is in series with a relay K so that while the stack is being shifted, the circuit through relay K is broken, normally open contacts K1 remain open so that the stack shift means can not receive an impulse or be energized until the stack means has been shifted to bring its next stack into alignment with the conveying means.

Automatic control means is provided for movement of the stack means from one stack to the next and return. In order to give maximum variation in the control and use of the stack means, the system of switches, as illustrated in FIGS. 19, 20, 21 and the circuitry as shown in FIG. 16, is used. Switch operating means is carried by the stack means and a convenient place for it is at the top. The sorter frame 20 carries a bracket 369 at the top thereof which extends over the top of the frame for the stack means. The bracket has a pair of spaced flanges 370 and 371. To one of the flanges is secured three switches in side by side relation and to the other flange there is secured three other switches in side by side relation but not in alignment with the first set of three switches. The number of switches in each set is equal to the number of stacks minus one. The switches are operated in a manner as will be described.

The circuit illustrated in FIG. 15 is for a stack means or bin having two stacks of pockets. With a stack means having more than two, such as the four stack unit illustrated in FIG. 17, the basic circuitry of FIG. 15 is used with slight modification and the addition of the circuitry illustrated in FIG. 16 and shown generally in dot-dash lines in FIG. 15 for automatic restart of sorting when the next stack is moved into alignment. The change in the circuitry of FIG. 15 includes a substitution for the solenoid 231, of the switch 365 and a relay K connected in series. In addition the stack switch 307 is substituted by normally closed relay contacts L1.

The additional circuitry, FIG. 16, includes the pair of clutch solenoids 344 and 347 with closed relay contacts L1 in series with the clutch solenoid 344 and open relay contacts L2 in series with clutch solenoid 347. In series with both clutch solenoids circuits are normally open contacts K1 which is connected with the main power line 262. The restarting circuit of the four stack construction also includes the selective switching means including the relays LA and LB forming an interlocking relay controlling the condition of contacts L1 and L2. Such an interlocking relay is well known and its operation is that when relay coil LA is energized then contacts L1 are closed and contacts L2 are opened and both contacts held in this condition until relay coil LB is energized. When relay LB is energized this closes contacts L2 and opens contacts L1 which are held in this condition until relay coil LA is again energized. The relays LA, LB is connected with a selective switching means in conjunction with control switches 372 to 377 inclusive which are closed by the stack means. The closing of the switches may be accomplished in various ways. That shown includes switches carried by the frame above the stack means and the switch operators are carried by the latter. The switches are shown in groups of three. Switches 373, 374, 376, and 377 are of the known knuckle or knee type, that is, they have an operating lever with an pivot and knuckle N such that when the lever is pressed in one direction the switch closes but when pressed in the opposite direction the pivoted portion or knuckle N of the operating lever rotates on its pivot so that the switch remains open. Switches 373 and 374 of one set of three switches are closed for movement of the stack means forwardly or step by step and switches 376 and 377 of the other set of three switches are operated to closed position upon return movement of the stack means. Switches 372 and 375 are closed when stacks A and D are at the conveying means respectively. The switches are operated by switch operators shown particularly as flanges carried on the top of the stack means. Flange 382 is in alignment with and closes switch 372 when stack A is in alignment with the conveyor. When stack B is in alignment with the conveyor, flange 383, which is in alignment with switch 373, will close this switch. When stack C is in alignment with the conveyor, switch 374 is closed by its aligned flange 384. When stack D is in alignment with the conveyor, flange 385 closes switch 375. Upon return movement of the stack means, flange 386 closes switch 376 with stack C in alignment with the conveyor and flange 387 closes switch 377 when stack B is in alignment with the conveyor. Lastly when the stack means moves to return stack A to initial position, flange 382 closes switch 372. Since switches 372 and 375 are not knuckle switches their flanges 382 and 385 are higher so that all switches may be at the same level. Contacts L3 remain closed when contacts L1 are closed and open when contacts L1 open.

In a simple form of stack means control, relay coils LA and LB can be energized by manual switches in place of contacts L1 and L2, to shift the stack means upon completion of the filling of the pockets of each respective stack. A more sophisticated means is illustrated in FIG. 16 in that selector switch means 390, 391, and 392 are provided with each selector switch comprising a pair of switches each of which has six switches or posts a, b, c, d, e and f and all six switches being mounted on the same shaft or otherwise connected together to operate in unison. The various posts or contacts are connected together in such manner, as illustrated, that when the rotatable brushes are at posts a, the stack means automatically shifts successively to the next stack for all four stacks upon completion of sorting in the respective stack. When the switches are turned so that the brushes are at posts b, the stack means operates automatically successively with respect to stacks A, B and C and then returns to initial position. With the brushes in contact with posts C, the stack means operates automatically with respect to stacks 1 and 2. When the brushes are in contact with posts the automatic operation is with respect to the two stacks B and C. With the brushes on posts e the stack means operates automatically with respect the stacks B, C and D. With the brushes in contact with posts f the stack means operates automatically with respect to stacks C and D. Note that with the brushes in contact with posts c, the structure and operation is essentially identical with that of stack means having two stacks.

It is obvious that with permanent connections as in setting (a) the stack means will move automatically step by step in alignment with the conveying means from stack A to stack B, to stack C, to stack D and then return stack A to initial position. This simple form may entail unused movement such as if there are 150 pages in the book and three stacks are used. Selector switch 390 is shown as having its two rotatable contacts connected together, however, this switch could be identical with the other double switches and the two rotatable brushes or contactors connected by an external wire. It is clear too that a three stack sorter combination results if the circuitry is the same as that as when the brushes of the selector switches are on posts b.

The operation with the selective switch means will now be described. Stack A is opposite the conveyor means which means that switch 372 is closed. Sheets are sorted into the pockets of stack A and when the sheet directing means is two pockets from the bottom, the count switch 308 opens to deenergize relay J open contacts J2 deenergize interrupt solenoid 309 so that sheets are not fed to the press. For the sheet feeder interrupt solenoid 309 is energized. The reason for this is that the two sheets to be sorted are on their way to stack A. The limit switch 185 or 247 is then opened to halt indexing and when this occurs one of the switches 185b or 247b is closed, closing the circuit through wire 296, switch 232b, clutch switch 365 and relay K. This closes contacts K1, completing a circuit through K1, contacts L1, clutch solenoid 344 to operate the clutch and rotate the stack lever 317 through 180 degrees so that stack B is moved into alignment with the conveying means. In this position switch 372 has opened, switch 373 has closed but the circuit therefor goes to an open post c of the selector switch 390.

The cycle repeats for stack B and the stack means moves to bring stack C into alignment with the conveying means and switch 373 opens and switch 374 closes. This switch is connected with an open post b. The cycle repeats again after which the stack means is moved to bring stack D into alignment with the conveying means. In this position switch 375 closes so that a circuit is completed from wire 262, wire 395, selector switch 390, switch 375, wire 397, through relay LB and contacts K2 so that relay LB is energized and moves contacts L1 to open position and contacts L2 to closed position and they remain in this position. The cycle repeats for stack D and when a limit switch 185b or 247b closes relay K is energized contacts K1 close and the circuit is completed through contacts L2 return clutch solenoid 347 is energized so that the stack means is moved in a return direction to bring stack C into alignment with the conveyor means. When this occurs switch 376 closes completing a circuit through wire 395, selector switch 390, wire 398 to selector switch 392, switch 376 selector switch 392 wire 399, wire 296, switch 232b, clutch disc switch 317, relay K to close contacts K1 and energized clutch return solenoid 347 and the stack means moves to bring stack B into alignment with the conveying means. This closes switch 377 which again energizes relay K, closing contacts K1, energizing return clutch solenoid 347 and the stack means moves to bring A to the conveying means. This closes switch 372 which completes the circuit through relay LA which restores contacts L1 to closed position and contacts L2 to open position. Sorting is halted by the opening of contacts L3 when relay LB is energized which deenergizes relay J, opening contacts J2 and deenergizing interrupt solenoid 309. The plates on the press are then changed and the sorting process is repeated.

If solely stacks A, B, and C are to be used, selector switches 390, 391, 392 are turned to bring their brushes in contact with post b. In this position it will be noted that the brushes b of selector switch 392 are unconnected, however, when switch 374 closes, a circuit is completed through selector switch 390, posts b, switch 374 wire 397 and relay L which is energized and the contacts L1 open and contacts L2 close so that when sorting has been completed in stack C and relay K is energized to close contacts K1 the circuit is closed through return solenoid 347 whereupon the return cycle is repeated to bring stack B and then stack A into alignment with the conveying means as described above and sorting halts. The plate on the press is changed and the cycle is repeated when switch 310 is closed.

In the same manner the circuit can be traced in the combination of stack means to be used as set out above.

Energization of relay K also closes contacts K2 in series with relays LA and LB to complete this circluit. Contacts K2 are not necessary for about 25 pockets but operation improves for a larger number of pockets. Whenever relay LA is energized contacts L3 closes and whenever return relay LB is energized, contacts L3 open consequently upon the return movement of the stack means, relay J remains unenergized, closing contacts J2 so that interrupt solenoid 309 is energized and the feeding of sheets to the press does not occur during the return movement of the stack means.

Note that when the selector switches have their brushes on posts b for use of three stacks, this arrangement is the same for a sorter having only three stacks.

In order to assure that the position of the stack shifting lever 317, the cam disc 352 with its cams 353, 355, and notch 360 remain in fixed relation at all times, the sprocket and cam disc are fixed to the shaft 33 and a friction disc connection or clutch is provided between the driven gear 229 and the shaft 33. The friction disc 401 is secured to the shaft 33 and a spring 402 presses the gear 229 against the friction disc for a drive connection which cam slips if the stack means should be jammed for any reason however, the sprocket 37, cam disc 352 with its cams 353, 355 and notch 360 all retain their relative position with respect to each other.

The contactors K2 closed by the relay K is unnecessary if the number of pockets in each stack is about 25 or 26. For a larger number of pockets this contactor assures uninformity of operation perhaps because of more precise timing.

It will be noted that if the sorter is to be operated as a multistack unit without selection of stacks and selection of number of stacks, end switches 372 and 375 and switches 376, 377 are all that is needed since end switch 372 has energized relay LA and closed L1 and no further control of the forward movement resides in switch 372. Switches 373 and 374 are unconnected in the four stack shift. Similarly when the last stack is reached, return end switch 375, closes to energize return relay LB, the contacts L2 remain closed until the stack means returns the first stack to sheet delivery position when switches 376, and 377 close, power is applied to the control relay K to again close contacts K1 momentarily to again initiate the return movement of the stack means until forward stack movement switch 372 is closed.

It is clear that for a stack means of three stacks, the selective switch 392 is dispensed with as well as switches 374 and 376 and the related selector switch contacts. With a three-stack sorter the combinations would be stacks A, B and C or stacks A and B or stacks B and C. Duplication of selector switches and stack control switches such as 374 and 376 permits a sorter of any number of stacks to be constructed.

Switch 308 is called a count switch because it counts so many pockets and then closes. Its purpose is basically a time switch in that it closes far enough ahead of the last pocket to receive a sheet so that there are enough sheets between the feeder and the delivery end of the conveyor to place a sheet in each of the remaining pockets. Similarly, restart switch 306 is closed far enough ahead of actual restart time so that the sorter operations, such as return of the ramp means to initial position, can be completed before the sorting operation repeats.

This invention is presented to fill a need for improvements in a Sheet Sorter with Automatic Feed Control and Restart. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A combination of sheet sorter and sheet feeding means for a sheet feeder or press comprising a sorter frame, conveying means having a sheet receiving end and a sheet delivery end including directing means at the delivery end of the conveying means moving in one direction to feed a sheet into successive pockets of a stack and a return movement; stack means including at least two stacks adjacent to each other and each stack having a plurality of pockets in adjacent successive relation; means mounting the stack means for lateral movement with respect to the delivery end of the conveying means; stack shifting means operatively connected with the stack means to move an adjacent stack into alignment with the delivery end of the conveying means and to return the stack means, and stack shifting control means automatically operable upon the directing means reaching the last pocket to receive a sheet in the stack to initiate operation of the stack shifting means; starting switch means manually operable to closed position to energize the power lines; sheet feeding means to supply sheets to the conveyor; interrupting means on the sheet feeding means to control the feeding of sheets including an interrupting circuit having in series at least one interrupt contactor and an interrupt solenoid, an interrupt control circuit for the interrupt solenoid including in series a count switch connected with the sheet directing means to open this switch when there are enough sheets between the sheet feeding means and the end of the conveyor means to fill the remaining pockets and normally open hold contactors of a restart relay and a restart relay energization of which closes its hold contactors; and a normally open manual switch shunting the count switch and hold contactors for the restart relay and the restart relay operating the contactor means in the circuit with the interrupt solenoid to actuate the sheet feeder to feed sheets.

2. A combination as in claim 1 including a restart circuit shunting the count switch and the hold contactors for the control relay including in series a restart switch which is closed when the sheet directing means approaches the end of its return movement, and a switch means which is closed when the stack means moves in a forward direction and opens for movement of the stack means in a return direction.

3. A combination as in claim 1 in which the interrupt solenoid is energized to halt sheet feeding and in which there are main power lines and secondary power lines including normally closed interrupt solenoid contactor means connected with the main power lines operated to open position upon energizing of the secondary power lines and connected in series with the interrupt solenoid, a shunt interrupt solenoid circuit connected in series with the interrupt solenoid including a normally closed contactor operated to open position by the restart relay and normally open contactors which are closed with the energization of the secondary power lines.

4. A combination as in claim 3 including interconnecting contactor means connecting the main and secondary power lines, a circuit to energize the interconnecting contactor means including in series a normally open manual switch and interconnecting relay means and a hold circuit between a secondary power line and the interconnecting relay means, in which the interrupt solenoid contactor means is opened by energization of the interconnecting relay means, and the interrupt solenoid shunt circuit contactors are closed by the interconnecting relay means.

5. A combination as in claim 1 in which the interrupt solenoid is deenergized to halt sheet feeding including a single normally closed contactor in series with the interrupt solenoid connected with the power lines and operated to closed position by the restart relay.

6. A combination as in claim 2 in which the stack means has solely two stacks including a solenoid connected with the stack shifting means to initiate operation of the latter and in which the stack means switch is closed when the stack means moves to bring the second stack into sheet receiving position and opens upon return movement of the stack means.

7. A combination as in claim 1 in which the sheet directing means includes a pivoted ramp having a delivery end, indexing means connected with the pivoted ramp to index the delivery end successively to each pocket, indexing control means including a trigger operated by a sheet moving along the pivoted ramp to initiate operation of the indexing means, ramp return means to return the delivery end to initial position, and ramp return control means operated at the end of the indexing movement to initiate operation of ramp return means.

8. A combination as in claim 2 in which the sheet directing means includes a pivoted ramp having a delivery end, indexing means connected with the pivoted ramp to index the delivery end successively to each pocket, indexing control means including a trigger operated by a sheet moving along the pivoted ramp to initiate operation of the indexing means, ramp return means to return the delivery end to initial position, and ramp return control means operated at the end of the indexing movement to initiate operation of the ramp return means.

9. A combination as in claim 1 in which the stack means includes three or more stacks and in which the stack shifting control means includes a stack shift relay energized when the sheet directing means has reached the last pocket to receive a sheet, a multistack circuit including in series normally open contacts operated to closed position by the stack shift relay and a pair of direction circuits in shunt, one directional circuit having in series forward contactors and a stack means forward solenoid, and the other directional circuit having in series return contactors and a stack means return solenoid, the forward contactors and return contactors being interconnected such that when one contactor is closed the other is opened, a forward stack switch closed by the stack means when the first stack is in sheet delivery position and opened when the stack means is shifted from the first stack, the forward stack switch being connected with the forward relay of an interconnected relay means, a return stack switch means operated to closed position, when the last stack is in delivery position and connected with a return relay of the interconnected relay means and means to energize the stack shift relay to close the stack shift relay contacts.

10. A combination as in claim 9 including selective switch means equal in number to the number of stacks less one, each selector switch including contacts, the selector switches being adjustable to contactors for selecting any combination of adjacent stacks for receiving sheets.

11. A combination as in claim 9 in which the stack shifting means includes a rotatable stack shift lever having a center and oppositely directed arms each with an end, channel means carried by the stack means and spaced apart a distance corresponding with the stack width, the channels ending approximately in alignment with the center of the stack shift lever, the end of each arm engaging its respective channel or channels, the number of channels being the number of stacks less one.

12. A combination as in claim 11 in which the stack shift means includes a pair of oppositely driven gears, one gear being a forward gear and the other gear being a return gear clutch means including a clutch disc on each gear and a clutch element movable into clutching contact with a selected gear, a drive connection between the gears and the rotatable stack shift lever, the stack means forward solenoid being connected with the clutch element to move the same in one direction to engage the clutch element with the forward gear and the stack means return solenoid being connected with the clutch element to move the same in the other direction to engage the clutch element with the return gear, and means to return the clutch element to unclutched position.

13. A combination as in claim 12 in which the means to return the clutch element to unclutched position is a cam disc having a shifting cam on opposite sides thereof engaging the clutch element and rotated by the forward and return gear.

14. A combination as in claim 13 in which the cam disc has a switch operator carried thereby and in which the means to energize the stack shift relay being a stack shift means control switch operated to open position upon rotation of the cam disc and operated to closed position upon return of the disc to initial position, and the stack shift means control switch being connected in series with the stack shift relay.

15. A combination as in claim 14 including a friction drive means between the clutch element and the cam disc and the stack shift lever to retain the same in the same relative position.

16. A sheet sorter as in claim 8 in which the ramp return control means includes a delay means set into operation when the pivoted ramp reaches the last pocket to receive a sheet and connected with the ramp return control means to delay the initiation of operation of the ramp return means to complete delivery of the last sheet or sheets.

17. A sheet sorter as in claim 16 in which the ramp return control means includes normally open return contactors in series with a ramp return solenoid to initiate the operation of the ramp return means, and the delay means including a delay relay operating a delay switch in series with a ramp return relay operatively connected with the return contactors to close the latter, and a holding circuit shunting the delay switch including in series normally closed return limit switch means and normally open holding contactors operated to closed position by energizing of the ramp return relay.

References Cited

UNITED STATES PATENTS

| 3,356,362 | 12/1967 | Mestre | 270—58 |
| 3,414,254 | 12/1968 | Snellman et al. | 270—58 |
| 3,420,517 | 1/1969 | Snellman et al. | 270—58 |

EUGENE R. CAPOZIO, Primary Examiner

P. V. WILLIAMS, Assistant Examiner

U.S. Cl. X.R.

271—64